(12) United States Patent
Kunimine et al.

(10) Patent No.: US 8,444,240 B2
(45) Date of Patent: May 21, 2013

(54) DATA GENERATING APPARATUS, INK-JET PRINTING APPARATUS, AND DATA GENERATING METHOD

(75) Inventors: Noboru Kunimine, Tokyo (JP); Rie Takekoshi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 296 days.

(21) Appl. No.: 13/034,069

(22) Filed: Feb. 24, 2011

(65) Prior Publication Data
US 2011/0216110 A1 Sep. 8, 2011

(30) Foreign Application Priority Data
Mar. 3, 2010 (JP) .................... 2010-046408

(51) Int. Cl.
*B41J 2/17* (2006.01)
*B41J 29/38* (2006.01)

(52) U.S. Cl.
USPC .............. 347/5; 347/9; 347/96; 347/101

(58) Field of Classification Search ............. 347/4, 5, 347/6, 9, 14, 19, 20, 40–43, 96, 98, 101, 347/107; *B41J 2/17, 29/38*
See application file for complete search history.

(56) References Cited

U.S. PATENT DOCUMENTS

| | | | | |
|---|---|---|---|---|
| 6,102,537 A * | 8/2000 | Kato et al. | ..................... | 347/101 |
| 6,120,141 A * | 9/2000 | Tajika et al. | ..................... | 347/96 |
| 6,439,708 B1 * | 8/2002 | Kato et al. | ..................... | 347/98 |
| 2002/0015085 A1 * | 2/2002 | Moriyama et al. | ............ | 347/101 |
| 2007/0024648 A1 * | 2/2007 | Hirakawa | .......................... | 347/6 |
| 2007/0146410 A1 * | 6/2007 | Kawakami et al. | ............ | 347/21 |
| 2009/0073203 A1 | 3/2009 | Takekoshi et al. | | |
| 2009/0073204 A1 | 3/2009 | Takekoshi et al. | | |

FOREIGN PATENT DOCUMENTS

| JP | 3799995 | 5/2006 |
|---|---|---|
| JP | 2007-276482 | 10/2007 |

* cited by examiner

*Primary Examiner* — Manish S Shah
*Assistant Examiner* — Roger W Pisha, II
(74) *Attorney, Agent, or Firm* — Fitzpatrick, Cella, Harper & Scinto

(57) ABSTRACT

Processing liquid is ejected by a scan which is as prior as possible to the ink if it is determined that the printing duty of the ink is relatively low. Furthermore, the processing liquid is ejected by a scan which is as posterior as possible to the ink if it is determined that the printing duty of the ink is relatively high. Accordingly, the change of the glossiness can be suppressed regardless of the change of the printing duty of the ink. At the same time, it becomes possible to adjust the glossiness with a minimum necessary amount of processing liquid since the glossiness is adjusted not by varying the amount of the processing liquid depending on the printing duty of the ink, but by varying the printing order.

6 Claims, 15 Drawing Sheets

SCHEMATIC DIAGRAM OF DOTS VIEWED FROM CROSS-SECTIONAL DIRECTION

PROCESSING LIQUID IS
PRINTED PRIOR TO INK
(FIRST PRINTING ORDER)

PROCESSING LIQUID
AND INK ARE PRINTED
SIMULTANEOUSLY PRINTED
(SECOND PRINTING ORDER)

PROCESSING LIQUID IS
PRINTED POSTERIOR
TO INK
(THIRD PRINTING ORDER)

SCHEMATIC DIAGRAM OF DOTS VIEWED
FROM SURFACE DIRECTION

SCHEMATIC DIAGRAM OF DOTS VIEWED
FROM CROSS-SECTIONAL DIRECTION

SCHEMATIC DIAGRAM OF DOTS VIEWED
FROM CROSS-SECTIONAL DIRECTION

DATA GENERATING APPARATUS, INK-JET PRINTING APPARATUS, AND DATA GENERATING METHOD

BACKGROUND OF THE INVENTION

1. Field of the Invention

The present invention relates to a data generating apparatus, an ink-jet printing apparatus, and a data generating method, and particularly to a configuration of adjusting glossiness of an image formed with ink by ejecting processing liquid in addition to ink.

2. Description of the Related Art

In a field of ink-jet printing apparatus, conventional ink jet printing apparatuses are known in which printing is performed by ejecting processing liquid in addition to ink in order to adjust glossiness of images formed with ink.

Japanese Patent Publication No. 3799995 describes an approach to uniformize the glossiness (reduction of gloss unevenness) and also to reduce the amount of processing liquid to be used, by ejecting overcoat liquid as the processing liquid having film forming ability at a rate of 30 to 100 weight percent on a area where printing duty of the ink is 50% or more. Further, Japanese Patent Laid-Open No. 2007-276482 describes a technology of reducing the gloss unevenness by adjusting the amount of ejected pigment ink and the amount of ejected clear ink as the processing liquid so that the amount of resin per unit area is constant. Specifically, an approach is described which adjusts the amount of ejected clear ink so that the amount of resin applied to respective unit areas becomes equal by focusing on the resin ingredient contained in the pigment ink and the resin ingredient in the clear ink.

Although both technologies described in Japanese Patent Publication No. 3799995 and Japanese Patent Laid-Open No. 2007-276482 can reduce the gloss unevenness to a certain extent, there is a fundamental problem that processing liquid consumption increases. Specifically, the technology of Japanese Patent Publication No. 3799995 increases the consumption of processing liquid as the printing duty of the ink becomes higher. In addition, since transparent resin is not overcoated on an area with the printing duty of the ink being 50% or less, there is a problem that the gloss unevenness is not sufficiently improved. Furthermore, the technology of Japanese Patent Laid-Open No. 2007-276482 increases the consumption of clear ink because a large amount of clear ink is applied on an image area with a low printing duty of the ink.

SUMMARY OF THE INVENTION

The object of the present invention is to provide a data generating apparatus, an ink-jet printing apparatus, and a data generation method which can reduce the gloss unevenness and also suppress increase of the consumption of processing liquid by efficiently using the processing liquid to reduce the gloss unevenness.

In a first aspect of the present invention, there is provided a data generating apparatus that generates respective printing data of ink and processing liquid that are used for printing in which a printing head for ejecting the ink and the processing liquid for forming a transparent layer on a surface of a printing medium is used to eject the ink and the processing liquid to the printing medium while the printing head is moved relative to the printing medium, the apparatus comprising: an acquiring unit configured to acquire printing duty for a unit area of the printing medium, the printing duty being based on the printing data of the ink; and a control unit configured to control an ejection order of the ink and processing liquid in ejecting the ink and processing liquid to the unit area of the printing medium under the relative movement of the printing head, so that an amount of the processing liquid ejected prior to the ink is greater than the amount of the processing liquid ejected posterior to the ink in a case of a first printing duty and the amount of the processing liquid ejected prior to the ink is smaller than an amount of the processing liquid ejected posterior to the ink in a case of a second printing duty that is higher than the first printing duty.

In a second aspect of the present invention, there is provided an ink jet printing apparatus that performs printing in which a printing head for ejecting the ink and the processing liquid for forming a transparent layer on a surface of a printing medium is used to eject the ink and the processing liquid to the printing medium while the printing head is moved relative to the printing medium, the apparatus comprising: an acquiring unit configured to acquire printing duty for a unit area of the printing medium, the printing duty being represented by the printing data of the ink; and a control unit configured to control an ejection order of the ink and processing liquid in ejecting the ink and processing liquid to the unit area of the printing medium under the relative movement of the printing head, so that an amount of the processing liquid ejected prior to the ink is greater than the amount of the processing liquid ejected posterior to the ink in a case of a first printing duty and the amount of the processing liquid ejected prior to the ink is smaller than an amount of the processing liquid ejected posterior to the ink in a case of a second printing duty that is higher than the first printing duty.

In a third aspect of the present invention, there is provided a data generating method of generating respective printing data of ink and processing liquid that are used for printing in which a printing head for ejecting the ink and the processing liquid for forming a transparent layer on a surface of a printing medium is used to eject the ink and the processing liquid to the printing medium while the printing head is moved relative to the printing medium, the method comprising: an acquiring step of acquiring printing duty for a unit area of the printing medium, the printing duty being represented by the printing data of the ink; and a control step of controlling an ejection order of the ink and processing liquid in ejecting the ink and processing liquid to the unit area of the printing medium under the relative movement of the printing head, so that an amount of the processing liquid ejected prior to the ink is greater than the amount of the processing liquid ejected posterior to the ink in a case of a first printing duty and the amount of the processing liquid ejected prior to the ink is smaller than an amount of the processing liquid ejected posterior to the ink in a case of a second printing duty that is higher than the first printing duty.

With the above configuration, the processing liquid is generally ejected before the ink is ejected, if it is determined that the printing duty of the ink is low. This allows variation of glossiness to be suppressed regardless of variation of printing duty of the ink. Additionally, it becomes possible to adjust the glossiness with a minimum necessary amount of processing liquid because the glossiness is adjusted by varying the printing order and not by varying the amount of processing liquid according to the printing duty of the ink.

As a result, the gloss unevenness can be reduced and processing liquid can be efficiently used to reduce the gloss unevenness, thereby suppressing increase of processing liquid consumption.

Further features of the present invention will become apparent from the following description of exemplary embodiments (with reference to the attached drawings).

DESCRIPTION OF THE EMBODIMENTS

Figure 1:
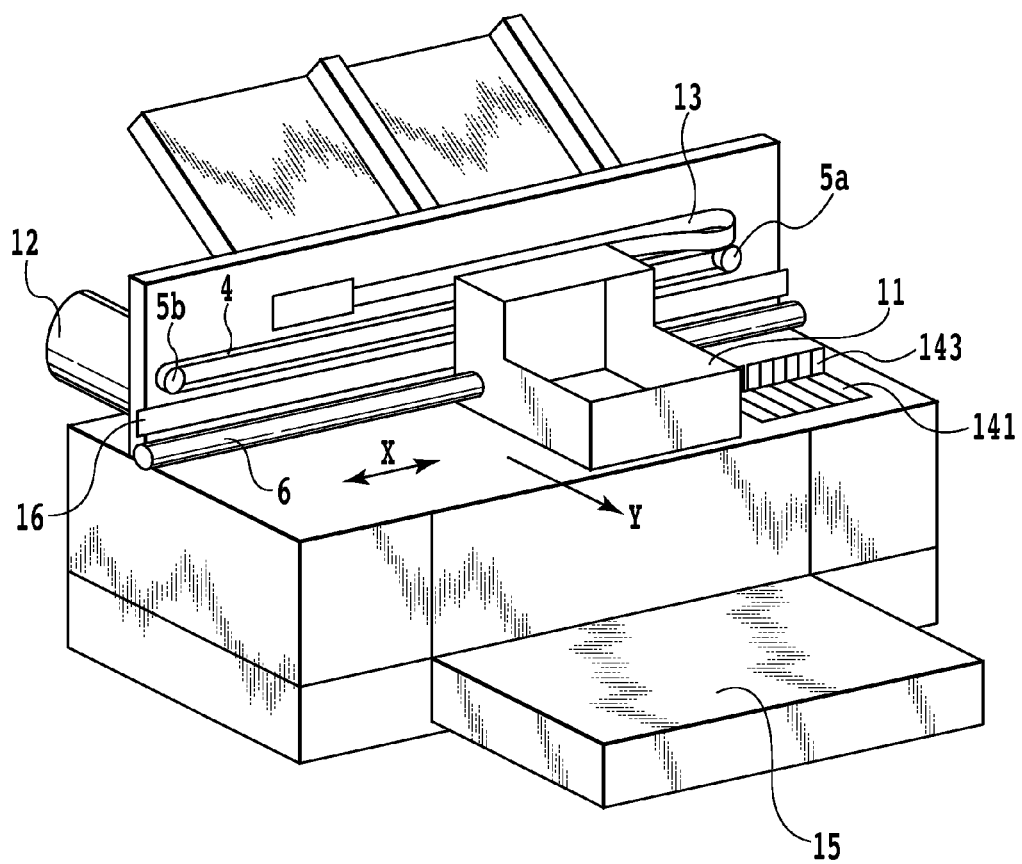
FIG. 1 is a perspective view schematically illustrating an ink-jet printing apparatus according to an embodiment of the present invention.

Embodiments of the present invention will be described in detail below, referring to the drawings.

First Embodiment

<Configuration of Ink-Jet Printing Apparatus>

FIG. 1 is a perspective view schematically illustrating an ink-jet printing apparatus according to an embodiment of the present invention. The apparatus shown in the figure, known as an ink-jet printer, makes use of a head cartridge (not illustrated in FIG. 1) which is an integration of a printing head that ejects ink and an ink tank that reserves the ink supplied thereto. The head cartridge is detachably mounted on a carriage 11. The carriage 11 can move along a guide shaft 6 in a reciprocatory manner, with the driving force of a carriage motor 12 being transmitted to the carriage 11 via a belt 4. The printing head can scan a printing medium by the movement of the carriage 11. An encoder sensor 16 optically detects the movement of the carriage 11, whereby the position of the carriage can be recognized. In addition, an electric signal is transferred to the printing head via a flexible cable 13 from a control part described below in FIG. 3. A cap 141 and a wiper blade 143 are used to perform a recovery processing of the printing head. In addition, a cassette 15 stores paper as the printing medium. Although the printing head and the ink tank are considered to be integrated in the above explanation, it is needless to say that they may be separately configured.

Figure 2:
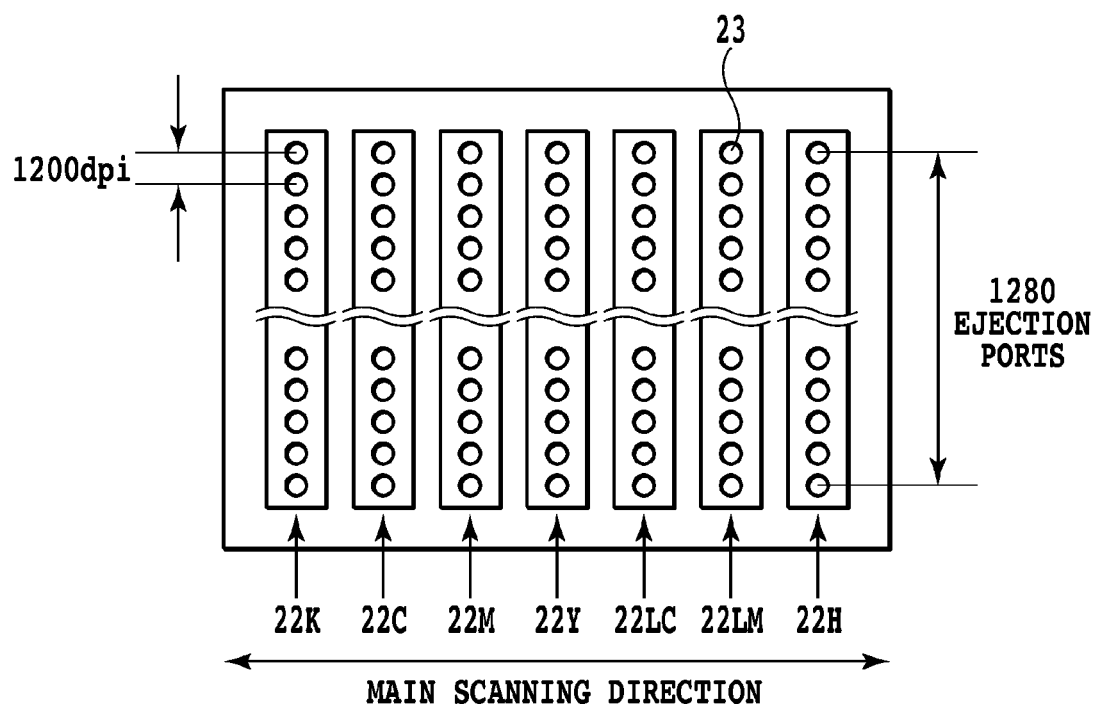
FIG. 2 is a view of a printing head on a head cartridge to be used in the apparatus illustrated in FIG. 1, viewed from the side where a ejection port is provided.

FIG. 2 is a view of the printing head on the above-mentioned head cartridge, viewed from the side where an ejection port is provided. As illustrated in FIG. 2, a printing head 22 of the present embodiment comprises seven printing heads 22K, 22C, 22M, 22Y, 22LC, 22LM, and 22H, which respectively eject black (K), cyan (C), magenta (M), yellow (Y), light cyan (LC), and light magenta (LM) ink, and the processing liquid (H). Among them, the LC-ink and the LM-ink have lower concentrations of the pigment, i.e., the color material, than the C-ink and the M-ink, respectively. The seven printing heads 22 are located in a state of being attached to the apparatus along a main scanning direction (X-direction). 1280 ejection ports 23 are arranged in each of the printing heads 22 along a direction intersecting with the main scanning direction at intervals corresponding to a density of 1200 dpi. The amount of the ink and the processing liquid ejected from each of the ejection ports 23 is about 4 ng.

Here, "processing liquid" refers to a type of liquid (image performance improving liquid) which is brought into contact with the ink to improve image quality and image stability. "To improve image quality" means improving the quality of an image by improving at least one of coloring, glossiness, haziness, and bronziness. In addition, "to improve image stability" means improving the stability of an image by improving at least one of abrasion resistance, weather resistance, water resistance, and alkali resistance.

<Printing Operation>

With the ink-jet printing apparatus described above, the printing head 22 scans along the main scanning direction (X-direction of FIG. 1), while ejecting the ink and the processing liquid according to the printing data from each of the printing heads. A predetermined amount of the printing medium is then conveyed along a sub-scanning direction (Y-direction of FIG. 1) every time a scan is performed. Printing on the printing medium is performed by repeatedly scanning the printing head and conveying the printing medium.

In the printing operation described above, ejecting to the printing medium is performed in order of respective color inks of black, cyan, magenta, yellow, light cyan, and light magenta, and the processing liquid with a single scan in the case of a one-way printing mode. Further, upon completion of printing in the single scan, the printing head 22 returns to its original home position to scan in the same direction again as described above. In the case of a two-way printing mode, scanning is also performed in the direction toward the home position, and ejecting is performed in order of the processing liquid and respective color inks of light magenta, light cyan, yellow, magenta, cyan, and black.

The present embodiment allows both the one-way printing mode in which the order of overlaying the ink and the processing liquid is always the same and the two-way printing mode in which the order of applying the ink and the processing liquid is reversed for each scan, and the order of applying the processing liquid relative to the ink, which will be described below, can be controlled in both printing modes.

<Control Block Diagram>

Figure 3:
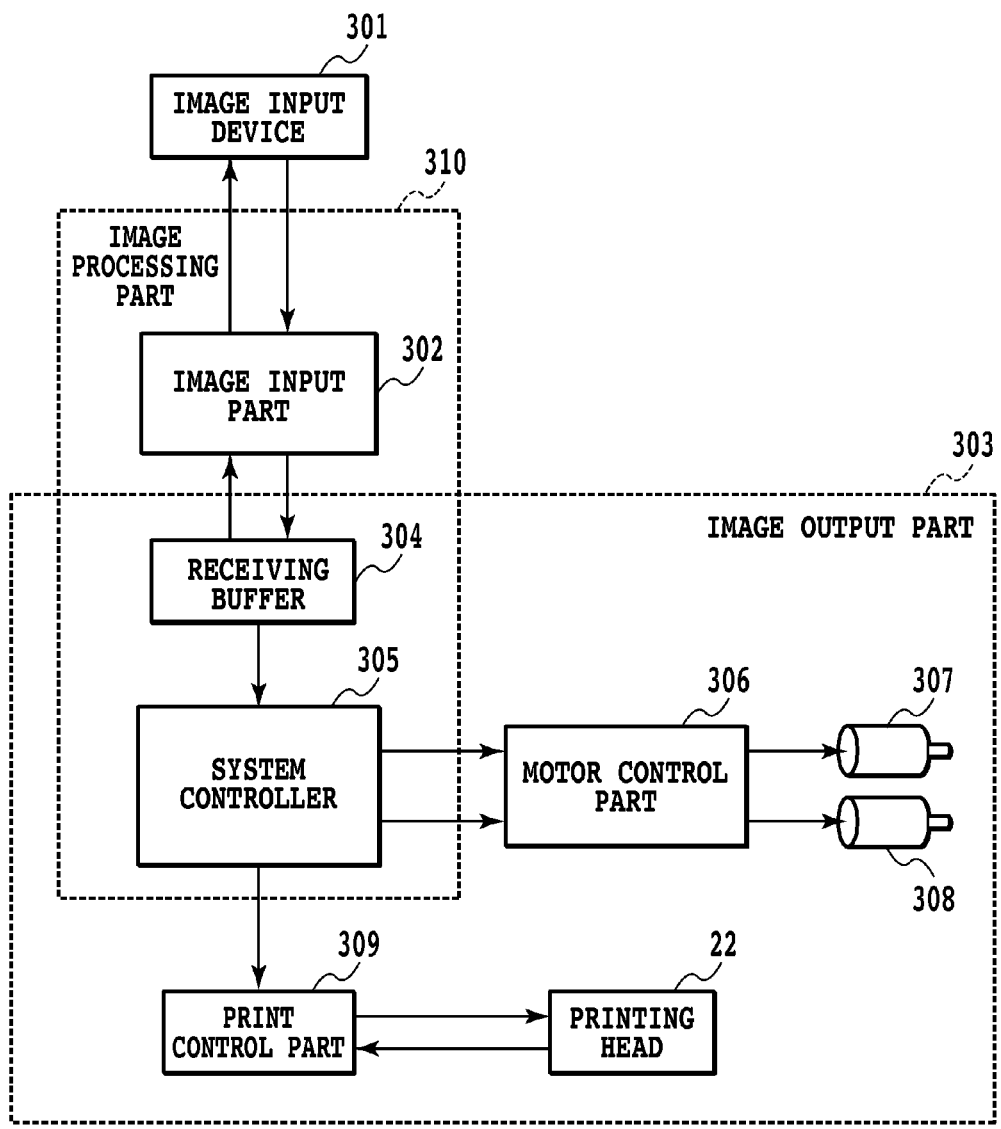
FIG. 3 is a block diagram illustrating a configuration of a control system of the ink-jet printing apparatus illustrated in FIG. 1.

FIG. 3 is a block diagram illustrating a configuration of a control system of the ink-jet printing apparatus shown in FIG. 1. Multi-valued image data from an image input device 301 such as a scanner or a digital camera, and multi-valued image data stored in various storage media such as a hard disk are input to an image input part 302. The image input part 302, which may be a host computer connected to the outside, transfers the image information to be printed to an image output part 303. The host computer can take the form of a computer as an information processor, or the form of an image reader.

A receiving buffer 309, which is an area for temporarily storing the data from the image input part 302, accumulates the received data until data is read from a system controller 305. The system controller 305 has provided therein a microprocessor, a ROM which has stored control programs, dot arrangement patterns, and mask patterns, and a RAM which provides a work area when performing various image processing. A dot arrangement pattern is a pattern for generating binary data from the multi-valued data, and a mask pattern is a pattern for determining a nozzle to be used in each scan in a multi-pass printing scan described later referring to FIG. 8 and the frequency thereof.

An image processing part 310, configured to comprise the image input part 302, the receiving buffer 304, and the system controller 305 described above, performs an image processing for generating respective binary data of the ink and the processing liquid, based on the multi-valued image data from the image input part 302. Specifically, the image processing part 310 generates printing data of the ink and the processing liquid as described later referring to FIG. 8. When the image input part 302 is a host computer, the image processing may be distributed between the image input part 302 and the system controller 305, or may be performed by the system controller 305 alone.

The system controller 305 also controls a carriage motor 307 which drives the printing head 22 for scanning via a motor control part 306, and a conveying motor 308 which conveys the printing medium in the sub-scanning direction. A print control part 309 controls ejecting of the ink and the processing liquid from the printing head 22, based on the generated binary printing data.

<Ink and Processing Liquid>

Specific compositions of the ink and the processing liquid in the present embodiment are shown in the following. Here, by using pigment ink as the ink and bringing the processing liquid into contact with the pigment ink, a layer is formed on the surface of the pigment ink layer or the printing medium to thereby be used for reducing gloss unevenness as well as improving image stability, as described below.

| (Cyan Ink) | |
|---|---|
| Cyan dispersion liquid | 20 parts |
| Glycerin | 10 parts |
| Diethylene glycol | 10 parts |
| Acethylene glycol EO adduct | 0.5 parts |
| (Product of Kawaken Fine Chemicals Co., Ltd.) | |
| Ion-exchange water | Remaining parts |

| (Light Cyan Ink) | |
|---|---|
| Cyan dispersion liquid | 4 parts |
| Glycerin | 10 parts |
| Diethylene glycol | 10 parts |
| Acethylene glycol EO adduct | 0.5 parts |
| (Product of Kawaken Fine Chemicals Co., Ltd.) | |
| Ion-exchange water | Remaining parts |

| (Magenta Ink) | |
|---|---|
| Magenta dispersion liquid | 40 parts |
| Glycerin | 10 parts |
| Diethylene glycol | 10 parts |
| Acethylene glycol EO adduct | 0.5 parts |
| (Product of Kawaken Fine Chemicals Co., Ltd.) | |
| Ion-exchange water | Remaining parts |

| (Light Magenta Ink) | |
|---|---|
| Magenta dispersion liquid | 8 parts |
| Glycerin | 10 parts |
| Diethylene glycol | 10 parts |
| Acethylene glycol EO adduct | 0.5 parts |
| (Product of Kawaken Fine Chemicals Co., Ltd.) | |
| Ion-exchange water | Remaining parts |

| (Yellow Ink) | |
|---|---|
| Yellow dispersion liquid | 40 parts |
| Glycerin | 9 parts |
| Ethylene glycol | 6 parts |
| Acethylene glycol ethylene oxide adduct | 1 part |
| (Product Name: Acethylenol EH) | |
| 1,2-hexanediol: | 3 parts |
| Polyethylene glycol (molecular weight 1000) | 4 parts |
| Ion-exchange water | remaining parts |

| (Black Ink) | |
|---|---|
| Black dispersion liquid | 50 parts |
| Glycerin | 10 parts |
| Triethylene glycol | 10 parts |
| Acethylene glycol EO adduct | 0.5 parts |
| (Product of Kawaken Fine Chemicals Co., Ltd.) | |
| Ion-exchange water | remaining parts |

| (Processing Liquid) | |
|---|---|
| Water-soluble acrylic resin | 3 parts |
| (resin solid content conversion) | |
| (Product Name: Joncryl J-683 made by Johnson polymer) | |
| Glycerin | 10 parts |
| Polyethylene glycol (molecular weight 1000) | 5 parts |
| Acethylene glycol EO adduct | 0.5 parts |
| (Product of Kawaken Fine Chemicals Co., Ltd.) | |
| Ion-exchange water | Remaining parts |

<Characteristic Feature of the Invention>
(Printing order of Processing liquid relative to Ink)

The present invention is made by focusing on the change of glossiness according to the printing order (ejection order) of the processing liquid relative to pigment ink and thus controls the printing order to reduce the gloss unevenness and also suppress the increase in the consumption of processing liquid.

Figure 4:
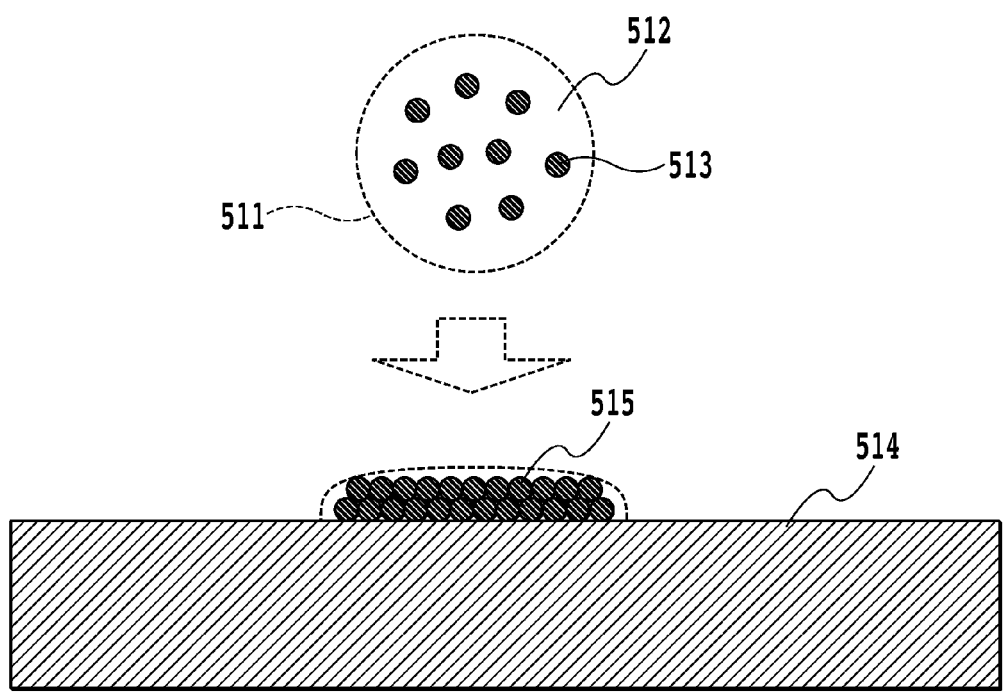
FIG. 4 is a schematic diagram describing how the ink is fixed on the surface of glossy paper when an image is formed by ejecting pigment ink on the glossy paper as the printing medium.

FIG. 4 is a schematic diagram explaining how the ink is fixed on the surface of glossy paper when an image is formed by ejecting the pigment ink on the glossy paper as a printing medium. In FIG. 4, an ink drop 511 contains particles 513 of the pigment, i.e., the color material of the ink, which are dispersed in a solvent component 512. When the ink drop 511 lands on the surface of the glossy paper, the pigment particles 513 are separated from the solvent component 512 on the surface of an ink receiving layer 514 to form a pigment ink layer 515 mostly composed of particles, because the pigment particles 513 are larger than inorganic particulates (not shown) constituting the ink receiving layer 514. As a result, surface asperity of the ink receiving layer 514 varies, thereby the glossiness of the printed image change. Generally, since the ink drop is fixed in an isolated manner to an area where the printing duty of the ink is low, the surface asperity worsens, thereby the glossiness decreases. On the other hand, the glossiness becomes higher as the printing duty increases, because the landed ink drops are connected and the printing medium surface is smoothed. As thus described, an image formed with pigment ink generally has the problem of degraded uniformity of surface gloss (gloss unevenness) due to variation of the glossiness depending on the printing location.

Figure 5:
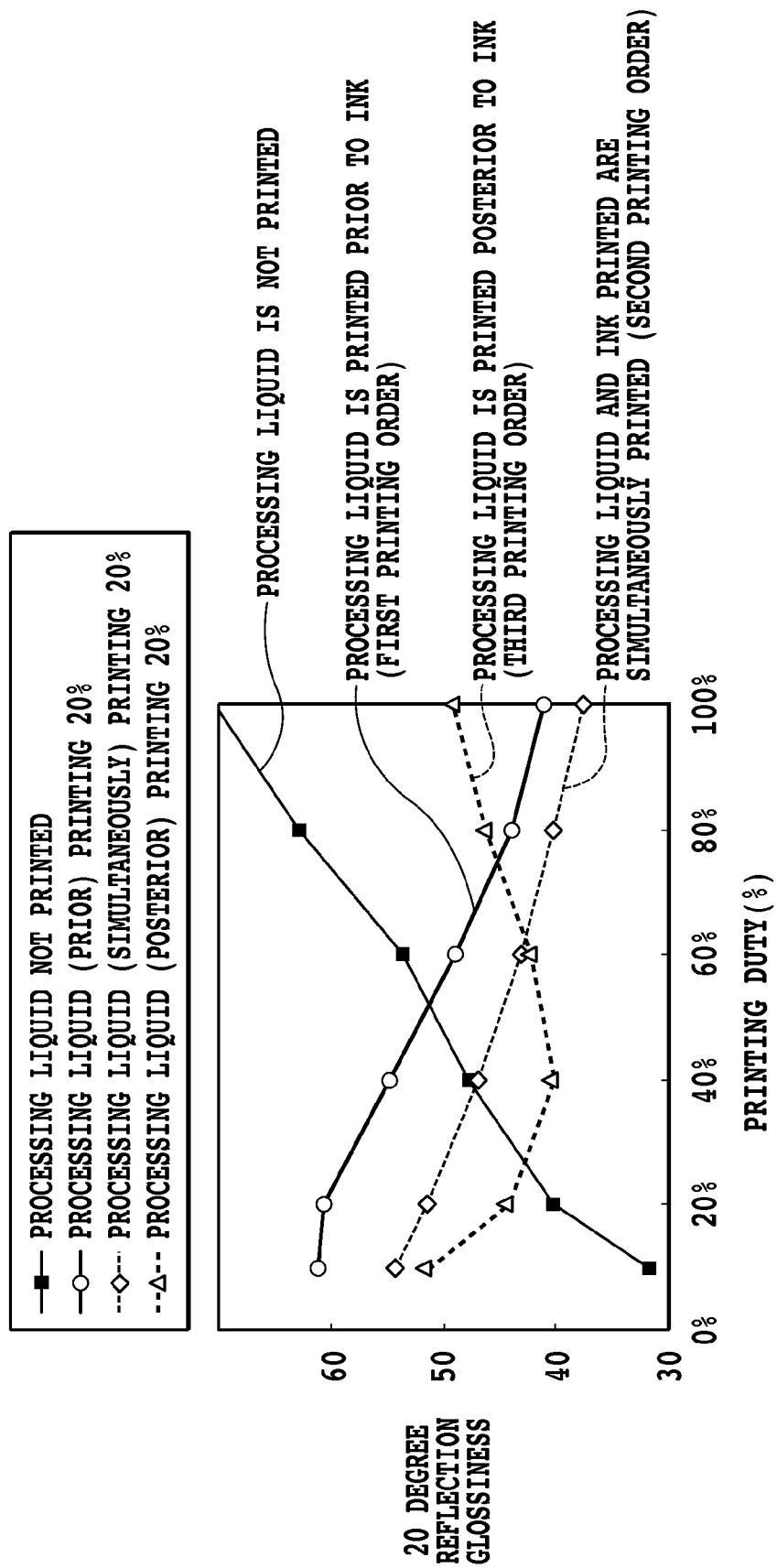
FIG. 5 is a graph describing the difference of glossiness according to the printing order of the processing liquid relative to the ink and printing duty of the ink.

FIG. 5 is a graph describing the difference of glossiness according to the printing order of the processing liquid relative to the ink and printing duty of the ink.

When the clear processing liquid containing the transparent resin of the present embodiment lands on the ink receiving layer 514 of the printing medium or the pigment ink layer 515 shown in FIG. 4, a transparent resin film (layer) is formed on their surface. The film causes the glossiness to vary. The example illustrated in FIG. 5 indicates 20 degree reflection glossiness when a multi-pass printing of eight passes and two ways is performed on the glossy paper by using the black ink and the processing liquid. Here, the amount of an ink drop is 4 pl and the glossy paper is a general ink-jet glossy paper to be used in printing photograph images or the like. The 20 degree reflection glossiness for the printing medium alone is 30 to 40. In addition, the printing duty of the processing liquid is 20%. A 100% printing duty herein corresponds to printing four dots with a 1200 dpi resolution on a pixel having a resolution of 600 dpi by using 4 pl ink.

As illustrated in FIG. 5, glossiness in the case of the absence of the processing liquid is the glossiness for the black ink alone, where the glossiness rises sharply as the printing duty of the ink increases. As described above, such difference of glossiness depending on the printing duty results in degrading image quality. Particularly, the range where the degree reflection glossiness is 30 to 60 and the range close thereto has a significant influence on the subjective visual evaluation, and therefore it is important to reduce variation in the glossiness while enhancing the glossiness in this range.

On the other hand, variation in the glossiness can be suppressed by printing through the use of the ink and the processing liquid. In this case, variation in the glossiness differs depending on the printing order of the black ink and the processing liquid, as illustrated in FIG. 5. A first printing order is the order of ejecting the black ink in a scan that is different from and posterior to the scan during which the processing liquid is ejected. A second printing order is the order of ejecting the processing liquid and the black ink in the same scan. A third printing order is the order of ejecting the processing liquid in a scan after the scan during which that the black ink is ejected.

As can be seen in FIG. 5, the first printing order exhibits the highest glossiness in a low printing duty area of the black ink. In addition, the glossiness of a low printing duty area tends to be lowered in the direction from the second printing order to the third printing order. It can be seen that there is a relatively large difference of glossiness depending on the printing order, although any of the first, second, and third printing orders has an effect of enhancing the glossiness compared with the case of no processing liquid being printed. The printing duty of the processing liquid stated above is assumed to be 20% of that of the ink in the illustrated example. In this case, the glossiness cannot be enhanced higher than the 20% printing duty of the first printing order even if the printing duty of the processing liquid is set to be 50% in the third printing order. Therefore, in the area where the printing duty of the ink is relatively low, it is desirable to eject the processing liquid in the first printing order, that is, in a scan before the scan in which the ink is ejected.

Figure 6A:
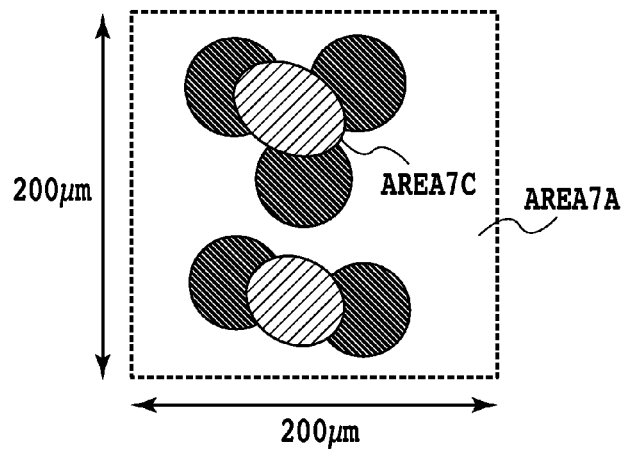
FIGS. 6A, 6B, and 6C are diagrams respectively illustrating states of an ink drop (also referred to as an ink dot, hereafter) having landed on the printing medium according to the above-mentioned first, second, and third printing order.
Figure 6B:
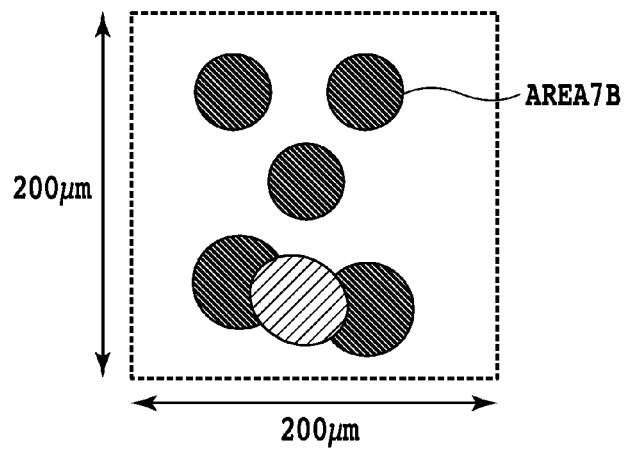
Figure 6C:
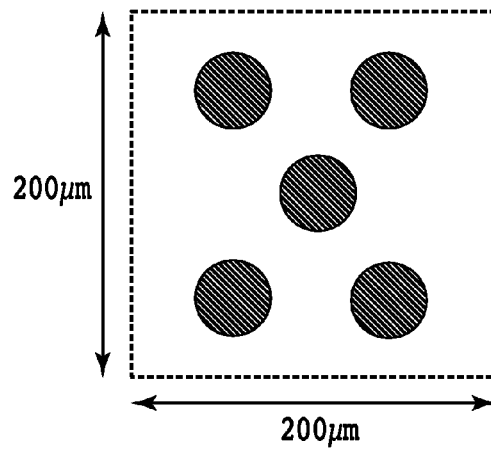

FIGS. 6A, 6B and 6C are views respectively illustrating a state of an ink drop (also referred to as an ink dot, hereafter) having landed on the printing medium according to the above-mentioned first, second, and third printing order. In FIGS. 6A to 6C, the area 7A indicates an exposed portion of the printing medium surface and the black area indicates an ink dot. It can be seen from the figures that ink dots have a truly circular area such as an area 7B, and an area such as an area 7C where pluralities of dots are mixed therein and spread in a blurred manner with slightly faded blackness. The area 70 is mostly observed in FIG. 6A according to the first printing order, less frequently observed in FIG. 6B according to the second printing order, and rarely observed in FIG. 6C according to the third printing order.

Figure 7A:
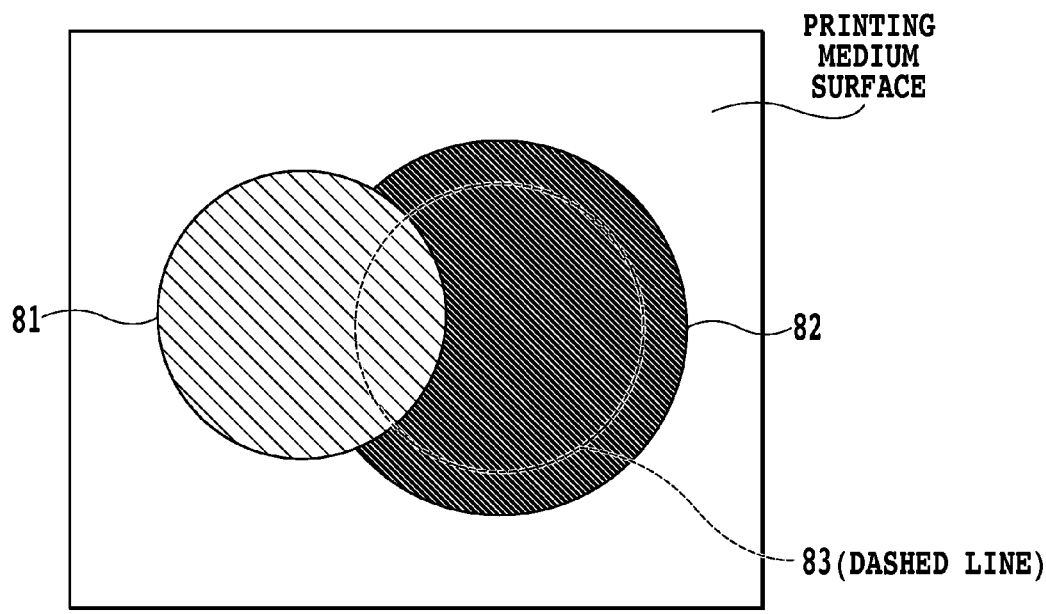
FIGS. 7A and 7B are schematic diagrams illustrating dots of the ink and the processing liquid to explain the relation between the observed phenomenon and the glossiness illustrated in FIGS. 6A to 6C.
Figure 7B:
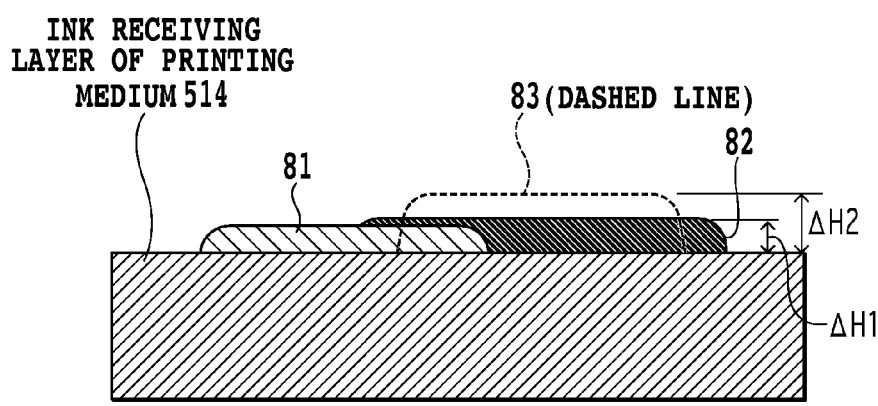

FIGS. 7A and 7B are schematic diagrams illustrating dots of the ink and the processing liquid, which explain the relation between the observed phenomenons illustrated in FIGS. 6A to 6C and the glossiness.

FIG. 7A illustrates dots of the processing liquid and the ink viewed from surface of the printing medium, and FIG. 7B illustrates the dots viewed from a cross-sectional direction. When the pigment ink later lands near a dot 81 of the processing liquid which is first landed on the printing medium and thereby forms an ink dot 82, the processing liquid dot 81 composed of transparent resin and the ink dot 82 cannot be mixed together sufficiently. Therefore, the ink dot 82 is formed in a manner avoiding the processing liquid dot 81, and the absorption of the solvent component in the pigment ink into the printing medium is obstructed by the processing liquid dot. As a result, spread of the ink dot 82 becomes larger. A dashed line 83 indicates the diameter of an ink dot in the absence of the processing liquid, where the diameter of ink dot 82 becomes larger than that of the ink dot in the absence of the processing liquid. In addition, since the spread of the ink dot 82 becomes larger, as illustrated in FIG. 7B, it is considered that the dot height formed on the surface layer of a printing medium 519 becomes lower in that the height of the dot changes from the height ΔH2 in the absence of the processing liquid to the height ΔH1. That is, it is considered that asperity of the printing medium becomes smaller because the ink dot spreads more, and thus the glossiness is increased.

The area 7C illustrated in FIG. 6A is in a state where the ink dots spreading in a manner avoiding the processing liquid dots are mixed together, and it can be seen that the glossiness becomes high in the first printing order in which the area 7C increases. Then the effect of increasing glossiness by printing the processing liquid prior to the ink significantly depends on the printing duty of the ink. Since a higher printing duty may cause the above-mentioned obstruction of the ink absorption to be too large, resulting in the occurrence of image unevenness such as beading, it is preferable that using the first order is limited to an image area where the printing duty of the ink is low. Depending on the type of the pigment ink, the order is preferably set such that the pigment ink is printed after the processing liquid having been printed, in an area where the printing duty of the pigment ink is lower than 50%.

On the other hand, the third printing order that prints the processing liquid after the printing of the pigment ink is preferred in an image area where the printing duty of the pigment ink is high. This is due to the fact that an image defect such as beading rarely occurs because the solvent component of the processing liquid can pass through a minute gap in the pigment ink dot when the processing liquid is applied on the pigment ink dot. In addition, there may be a case where the pigment ink dots are mixed if the printing duty of the pigment ink becomes high and thus the glossiness becomes too high. In such a case, by imparting asperity to the image surface by the processing liquid dots to thereby reduce the glossiness the other way around, the gloss uniformity can be adjusted.

Meanwhile, the printing order of the ink and the processing liquid is not limited to the above-examples in which respective printings are performed in different scans with the printing order of the processing liquid being prior or posterior to the ink, or respective printings are performed in the same scan with the printing order being simultaneous. More specifically, the simultaneous printing order may also be realized when the ink and the processing liquid are printed with the time difference during which the landed ink and processing liquid can be sufficiently mixed together. In addition, the printing order of the processing liquid may be an order prior or posterior to the ink printing also in the case that the processing liquid is printed prior or posterior to the ink and these printings of the ink and processing liquid are performed with the time difference during which they can not mix sufficiently. That is, the present invention is not necessarily applied only to the mode of defining the printing order in terms of scan, but for example, the printing order may be defined as the simultaneous according to the above-mentioned time difference, even when the ink and the processing liquid are printed in different scans. Furthermore, even when the ink and the processing liquid are printed in the same scan, the prior or posterior printing order may be realized, depending on the above-mentioned time difference. Alternatively, the present invention can also be applied to a so-called full-line type printing apparatus which performs printing while conveying the printing medium relative to a fixed printing head, with the printing order being prior, posterior, or simultaneous depending on the above-mentioned time difference.

As thus described, gloss uniformity can be improved efficiently and effectively without increasing the consumption of the processing liquid by controlling the printing order of the processing liquid to be prior or posterior to the ink depending on the printing duty of the pigment ink. Although the effect of controlling the printing order of the processing liquid to be prior or posterior to the monochrome black ink is shown in the above the example, such an effect can be similarly obtained when using a plurality of color inks. However, since the dot condition generated by contact of the ink and the processing liquid differs depending on the type of ink, it is preferred to set a printing duty area arbitrarily where the processing liquid is printed before or after the ink is printed. In addition, since the dot condition also differs between a monochrome color and multiple colors which form an image by a plurality of dots, it is preferred to design the printing order of the processing liquid in consideration of the actual image formation.

In addition, with regard to the printing order of the pigment ink and the processing liquid, the anteroposterior relation in the printing order of the pigment ink and the processing liquid does not necessarily have to be exactly defined as described above. That is, it is preferred that the amount of the processing liquid ejected prior to the pigment ink is greater than the amount of the processing liquid ejected posterior to the pigment ink in a low duty area. Also, it is preferred that the amount of the processing liquid ejected prior to the pigment ink is smaller than the amount of the processing liquid ejected posterior to the pigment ink in a high duty area. For example, a similar effect can be obtained since the printing order of the processing liquid is controlled to be generally prior or posterior relative to the pigment ink as a whole. Particularly, if the glossiness is attempted to be increased while maintaining the gloss uniformity, it is preferred to control the degree of priority or posteriority of the processing liquid depending on the printing duty of the pigment ink and the processing liquid in consideration of the properties of the pigment ink and the processing liquid.

(Configuration of Characteristic Image Processing Part of the Present Invention)

Figure 8:
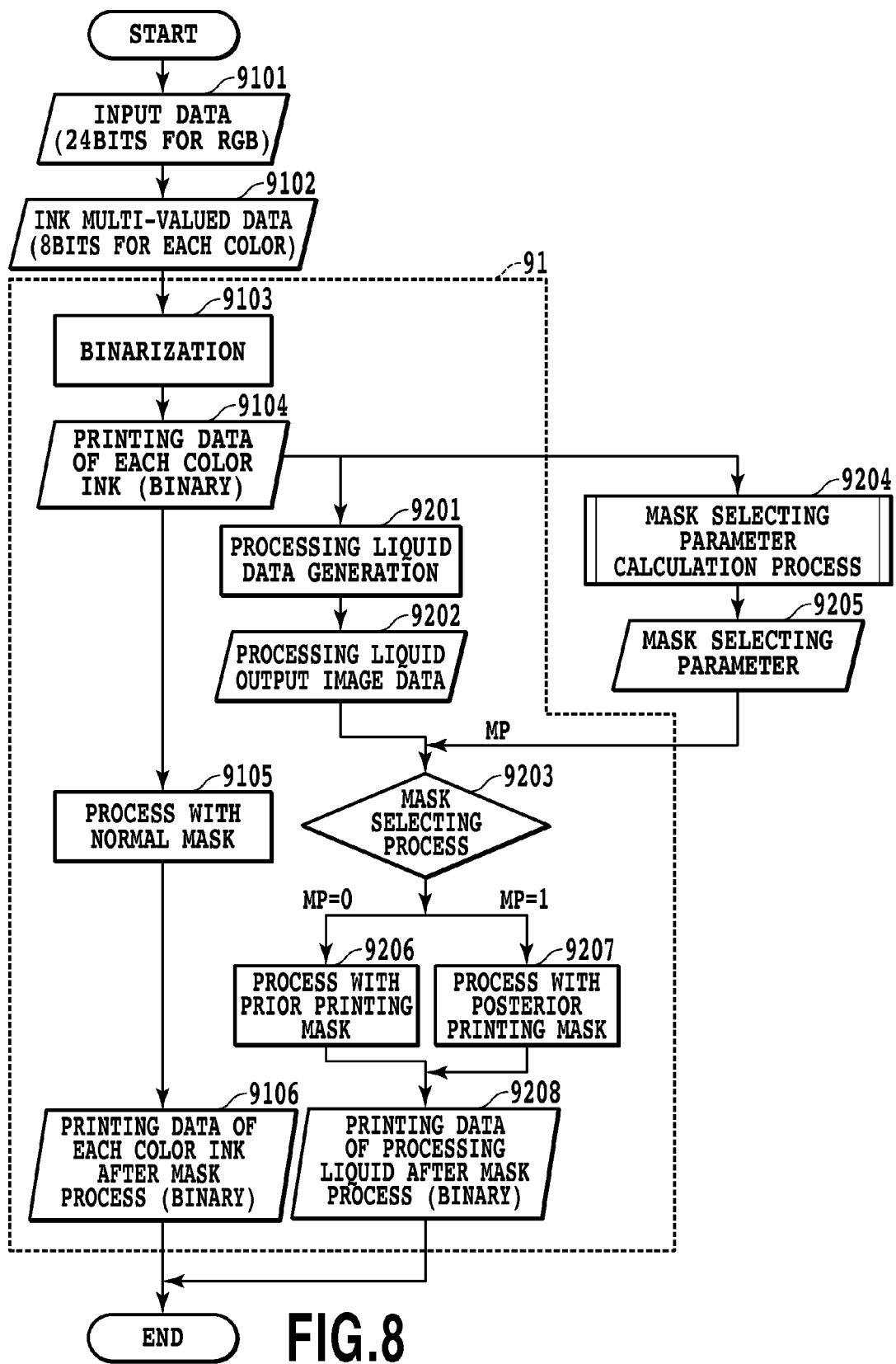
FIG. 8 is a flow chart illustrating an image processing by an image processing part in a first embodiment.

FIG. 8 is a flow chart illustrating an image processing by the image processing part 310, and particularly illustrating processes of generating printing data of the ink and the processing liquid and of defining the printing order. In FIG. 8, the rectangles indicate respective image processing steps and the parallelograms indicate data.

In FIG. 8, brightness density conversion and color processing are performed to correct input data 9101 of the brightness information RGB (red, green, blue) received from the image input device 301 or the like. The corrected data is converted into multi-valued data 9102 corresponding to respective color inks of K, C, M, Y, LC, and LM to be used for printing. The ink multi-valued data 9102 is, for example, an 8-bit data having about 256 gradation levels, and a resolution of 600 dpi.

The ink multi-valued data 9102 is quantized to be "N"-valued gradation data by a quantization part (not shown). Known methods such as multi-valued data error diffusion processing can be used for the quantization. The value of N is determined according to the relation between the input resolution and the output resolution. For example, 2×2, i.e., four dots of output data compose a single block for input image data of 8 bits per pixel when the input resolution is 600 dpi and the output resolution is 1200 dpi. The number of gradation that can be expressed by the single block is five. Therefore, five quantized values, i.e., "0", "64", "128", "192", and "255" are output from the quantization part. Respective quantized values correspond to the gradation values "0", "1", "2", "3", and "4". Further, a binarization part 9103 selects a dot arrangement pattern (binary data pattern) to be used for printing from among a plurality of dot arrangement patterns, based on the gradation value indicated by each quantized color data, and outputs binary printing data 9104 of each color ink. Here, the dot arrangement pattern has a 2×2 dot-size pattern for each gradation value when the input resolution is 600 dpi and the output resolution is 1200 dpi. The memory part for the dot arrangement pattern is installed in a semiconductor memory such as an EEPROM.

A masking process 9105 using a normal mask is performed on the binary printing data 9104 of each ink color obtained as described above. Specifically, printing data 9106 is generated for each scan in the 8-pass printing by a logical product operation of the binary printing data 9104 and the mask pattern of each color ink.

Figure 9:
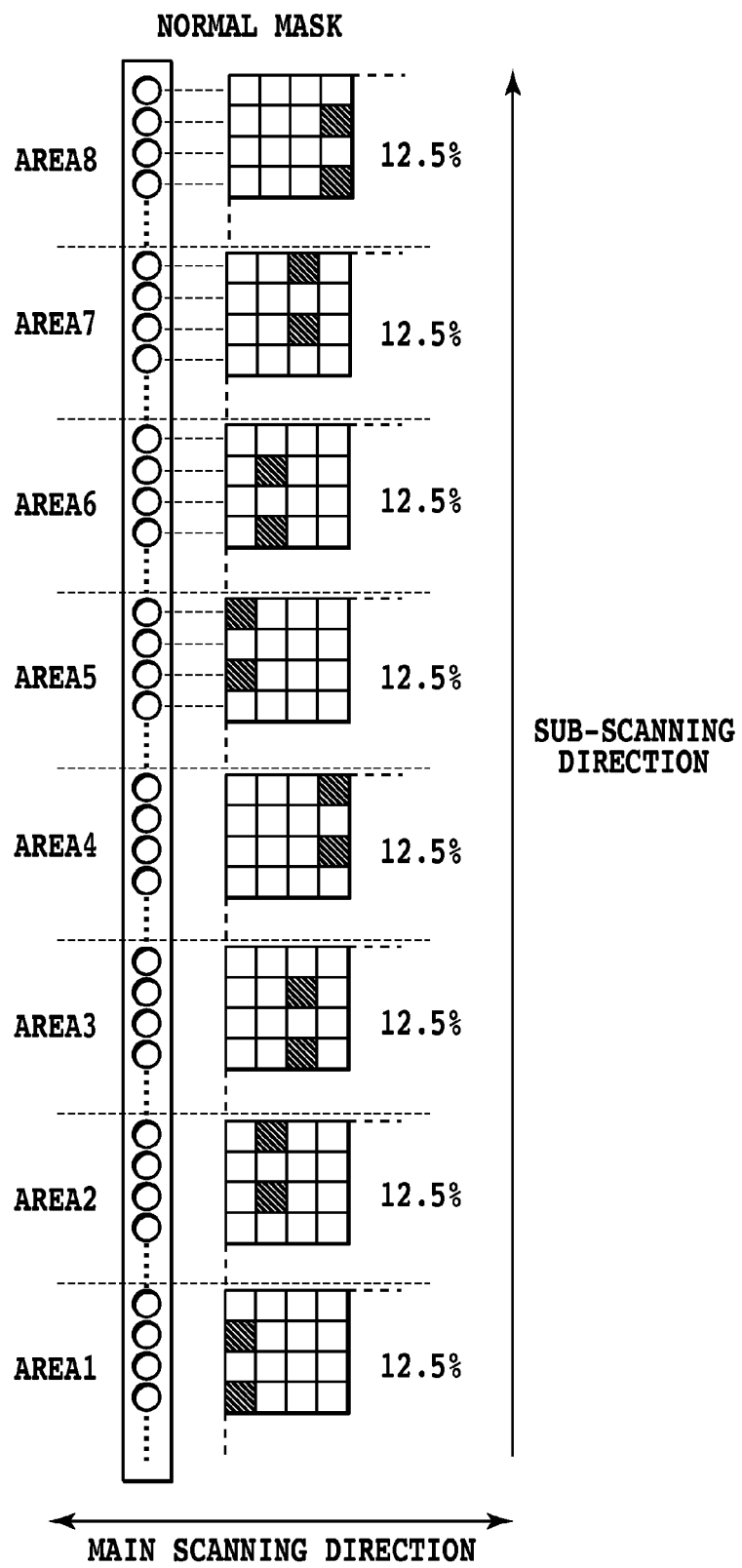
FIG. 9 is a diagram illustrating an example of a normal mask pattern to be used in the process 9105 of FIG. 8.

FIG. 9 is a view illustrating an example of a normal mask pattern used in the process 9105. Since the present embodiment performs 8-pass printing, a mask is divided into eight areas corresponding to the ejection port in the printing head 22 of each ink color. As indicated in FIG. 2, if an ink color has 1280 ejection ports, the number of vertical pixels is 1280/8=160 pixels in each scan of the eight-pass printing. In addition, the number of pixels in the horizontal direction of the mask pattern can be set arbitrarily.

An 8-pass printing completes printing of each area by eight (plural times of) scans by repeating, for each single scan of the printing head, an operation of conveying the printing medium along the sub-scanning direction for the length corresponding to the ejection port pitch of a group of divided ejection ports (corresponding to described each area) which is obtained by dividing the column of ejection ports into eight pieces. In this occasion, printing in a certain printing area which corresponds to one of the above-mentioned group of divided ejection ports is completed by eight scans, using the areas 1 to 8 of the mask illustrated in FIG. 9 in this order for each scan. The shaded areas in the mask are mask pixels (print permitting pixels) for which corresponding pixels in the printing data are permitted to be printed according to that printing data. With regard to the mask of the present embodiment, ratios of the print permitting pixels of the area corresponding to the scan are equally 12.5%. In addition, mask patterns corresponding to respective areas are in complementary relationship with each other, and the sum of the ratios of the print permitting pixels of the eight areas becomes 100%. In FIG. 9, although only a mask pattern of one ink color is shown for simplicity, mask patterns may be set for each ink color. In addition, although the nozzle usage ratios for respective printing scans are equally 12.5%, the use ratios may be changed for each area from the viewpoint of image uniformity between printing scans.

Referring to FIG. 8 again, the binary printing data 9104 of each color ink is sent to a processing liquid data generating part 9201 in which binary printing data 9202 of the processing liquid is generated based on the binary printing data 9104 of each color ink. The binary printing data 9202 of the processing liquid can be generated by, for example, the logical product (AND) of the logical sum (OR) of the binary printing data of respective ink colors and a predetermined thinning pattern. Here, the thinning pattern is a pattern for reducing, at a predetermined rate, the number of dots printed with the processing liquid.

In addition, there may be a case where the printing amount of the processing liquid is preferred to be changed for each type of the ink since the degree of density variation differs depending on the type of ink when brought into contact with the processing liquid. In that case, the printing data of the processing liquid can be generated by preparing a thinning pattern for each ink, taking the logical product of binary printing data of each color ink and the corresponding thinning pattern, and taking the logical sum (OR) of the results of the logical product obtained for each ink. Furthermore, the printing duty per unit area may be calculated based on each color ink multi-valued data 9102 or the binary printing data 9104, and amount of printing of the processing liquid can be determined according to the value thereof. For example, preliminarily setting may be performed such as a 20% printing duty of the processing liquid for a 0 to 25% printing duty of the ink per unit area, a 10% printing duty of the processing liquid for a 25 to 50% printing duty of the ink, and so on. However, it is needless to say that the generation of the binary printing data 9202 of the processing liquid can be performed by the combination of the above methods, without being limited to those mentioned above.

In either case, it can be determined that the processing liquid as a whole is printed prior or posterior to the ink by generating printing data of the processing liquid for each scan using a processing liquid mask, as will be described later in FIG. 10 and the like.

The binary printing data 9202 of the processing liquid is sent to a mask selection determining part 9203, in which an prior printing masking process 9206 or a posterior printing masking process 9207, which will be described later, is selected based on a mask selecting parameter (MP value) 9205 preliminarily calculated for each unit area.

A mask selecting parameter calculation process 9204 obtains the above-mentioned mask selecting parameter 9205 for each unit area based on the binary printing data of each color ink. Here, the unit area may be determined on the basis of the image resolution of intermediate processing data such as the input image data 9101 or the multi-valued data 9102. This allows a calculation operation to be efficiently performed. In addition, there may be a case where the processing resolution of the input image data 9101 or the intermediate processing data is high and therefore unsuitable for the size of the image area in which the difference of image characteristics can be actually recognized by the naked eye. In such a case, a plurality of these unit pixels can be collected to form the unit area. In addition, since the enhancement of processing speed is caused by collecting a plurality of unit pixels to form the unit area, it is preferable to carry out this collecting operation arbitrarily in consideration of the actual improvement effect of image characteristics.

In the present embodiment, the multi-valued data 9102 of each color ink which is one of the intermediate process data has a resolution of 600 dpi. Therefore, the mask selection parameter 9205 is calculated with a 300-dpi unit area formed by connecting two 600-dpi unit pixels in the horizontal and vertical directions respectively. In addition, since the smallest image resolution (=printing resolution) is 1200 dpi, the unit area corresponds to the smallest pixels of 4 pixels×4 pixels when the unit area is set to 300-dpi.

Figure 10:
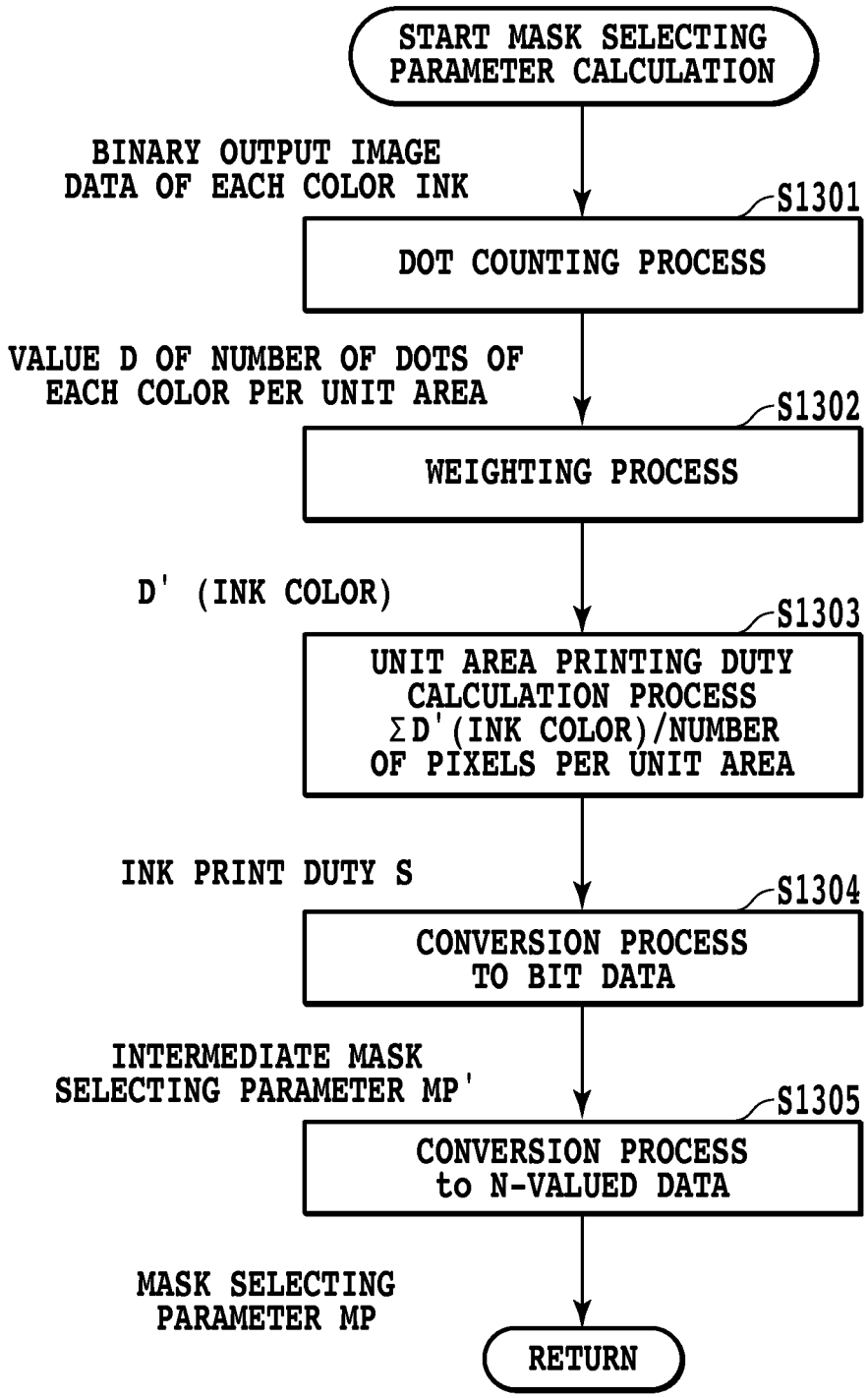
FIG. 10 is a flow chart describing the mask selecting parameter calculation process 9204 of FIG. 8.

FIG. 10 is a view describing the mask selecting parameter calculation process 9204 for each unit area mentioned above. Dot counting (counting the binary data indicating ink ejecting) is performed for each unit area for the binary printing data 9104 of each color ink to calculate the number of dots D for each ink color per unit area. Specifically, the binary printing data 9104 of each color ink is defined as "0: not printing" or "1: printing" for each pixel in the 4 pixels×4 pixels matrix, where the total sum of the counted "1: printing" is the value D. Assuming that the largest printing duty for a monochrome color of each color ink is 100%, the value D becomes an integer within the range of 0 to 16.

The value D of each ink color acquired as described above is converted into a value D' 9302 by a weighting process S1302. Here, the weighting process S1302 is a process performed due to the control threshold level for the printing order of the processing liquid relative to the ink differing depending on the type of ink. Specifically, the degree of variation of the density or the like differs depending on the type of ink when the ink is brought into contact with the processing liquid. For example, let the printing duty per unit area for printing the processing liquid prior be 25% or less and 50% or less, respectively, for ink A and ink B. In this case, the threshold level that controls the printing order of the processing liquid depending on the types of ink can be virtually adjusted by weighting the ink A twice the ink B in the unit area. In actual image forming, however, an image is formed by ejecting a plurality of types of ink on the unit area. Therefore, weighting coefficients are appropriately set by printing the processing liquid prior or posterior to the ink to form an image for images having a variety of printing duty of respective colors such as a monochrome ink color or multiple primary colors, and evaluating the printed image.

Next, the printing duty calculation process S1303 calculates the ink printing duty S, which is the ratio of the total number of dots of respective color inks printed in the unit area relative to the number of pixels per unit area, based on the value D' of the number of dots of each weighted ink color per unit area.

Furthermore, a conversion-to bit data process S1304 converts the ink printing duty S into bit data. For example, when converting the duty S into data of five bits, the range of 0% of the printing duty to (the largest duty) % is divided into 32 pieces and, depending on which of the 32 values representing this division range the printing duty S corresponds to, the corresponding value is set as an intermediate mask selecting parameter MP' (5 bits). Furthermore, a conversion-to N-valued data process S1305 converts the intermediate mask selecting parameter (MP') into an N-valued mask selecting parameter (MP). Although a method based on general error diffusion method or a dither matrix method may be used for the conversion-to N-valued data method, the present embodiment employs the error diffusion method. The value of N, corresponding to the type of mask pattern to be switched, is set to be 2 in the present embodiment since two types of mask patterns are used. Here, the two types of mask patterns are a prior printing mask pattern (A) to be used in the process 9206 with the prior printing mask, and a posterior printing mask pattern (B) to be used in a process 9207 with the posterior printing mask. That is, when performing the conversion process S1305 as N=2, a value "0" or "1" is assigned as a mask selecting parameter (MP) 9205 for each unit area, according to which the process 9206 with the prior printing mask or the process 9207 with the posterior printing mask is performed. Meanwhile, since the number of types of selectable mask patterns can be increased by setting N as a number larger than 2, the number of mask patterns used for switching is not limited to the examples of the present embodiment.

Although it is also possible to set a threshold value for controlling the printing order of the processing liquid based on the printing duty S of the ink and to obtain the mask selecting parameter (MP), the present embodiment performs the conversion-to N-valued data processing after performing the conversion-to bit data processing once. This is because directly binarizing the value after the calculation process S1303 may increase variation in the mask selecting parameters (MP) between adjacent unit areas. In order to suppress image defects caused by the difference of mask patterns to be used between adjacent unit areas, the conversion-to five bits data is performed once to reduce the amount of variation of the mask selecting parameter (MP), so that mask switching becomes continuous for each unit area. In addition, although a larger bit capacity of the conversion-to bit data process can reflect the printing duty per unit area more precisely, image noise specific to the error diffusion may occur when performing the conversion-to N-valued data processing by the error diffusion, if the bit capacity is too large. Therefore, it is preferred to select the bit capacity as appropriate, in consideration of the actual effect and image noise.

Figure 11A:
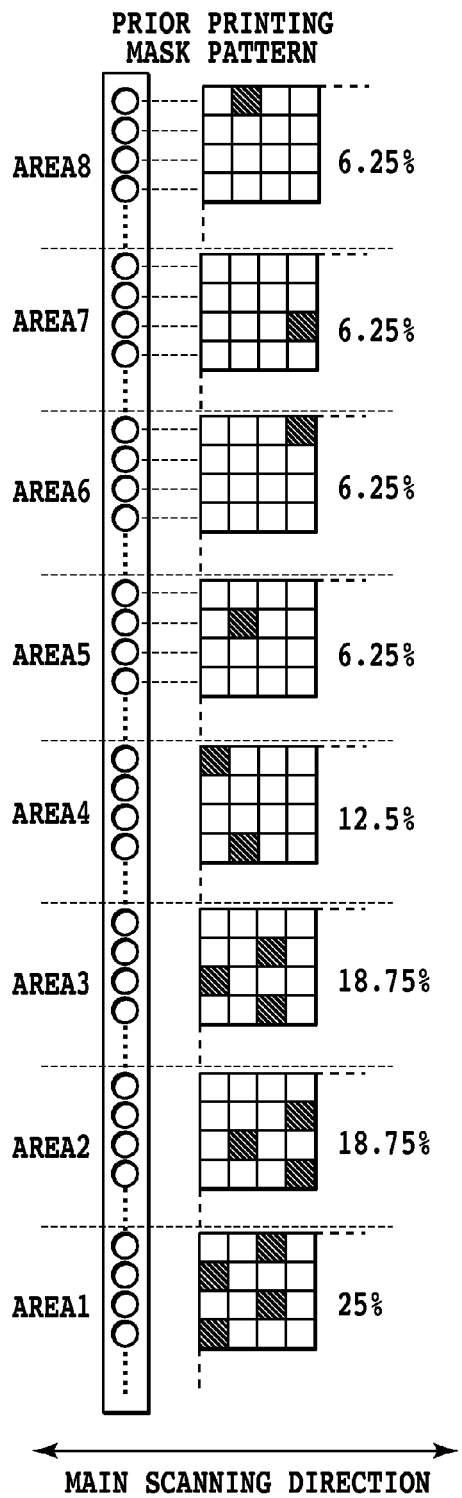
FIGS. 11A and 11B illustrate an example of a mask pattern of a prior printing mask and a mask pattern of a posterior printing mask for the processing liquid in the first embodiment.
Figure 11B:
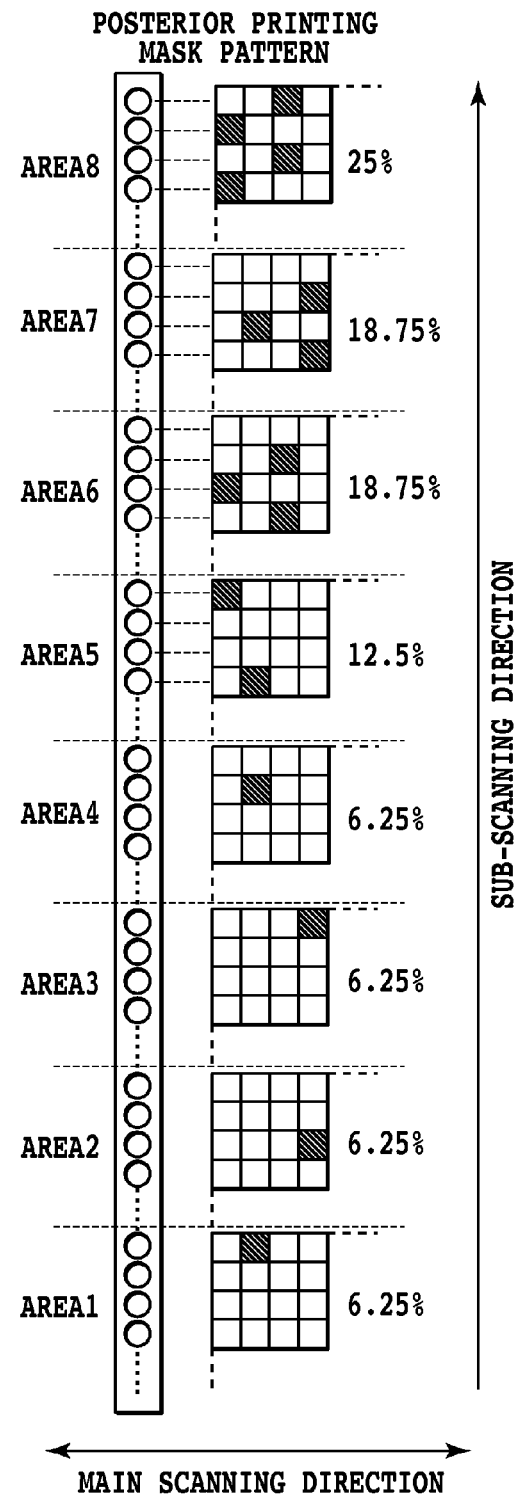

FIGS. 11A and 11B are views illustrating an example of a mask pattern of a prior printing mask and a mask pattern of a posterior printing mask for the processing liquid.

Since the present embodiment performs 8-pass printing, the patterns of the prior printing mask and the posterior printing mask have eight areas in response to a group of divided nozzles of the printing head that ejects the processing liquid, in the same way as the mask pattern for the ink described in FIG. 9.

The prior printing mask pattern illustrated in FIG. 11A has the highest ratio, which is 25%, of the print permitting pixels of the first area, with the ratio of the print permitting pixels gradually lowering in the second and subsequent areas. That is, the ratio of print permitting pixels corresponding to nozzle group located in front end portion of the nozzle arrangement in a printing medium conveying direction is higher than the ratio of print permitting pixels corresponding to nozzle group located in back end portion of the nozzle arrangement in the printing medium conveying direction, for the unit area of the printing medium. Specifically, the ratio of the print permitting pixels of a mask corresponding to the first scan (initial scan) relative to each printing area in which printing is completed by eight passes is 25% which is the highest, and subsequently, 18.75% in the second scan, 18.75% in the third scan, and 12.5% in the fourth scan. Furthermore, the ratio becomes 6.25% in the fifth to eighth scans. when comparing between the pattern illustrated in FIG. 11A and the normal mask pattern for the ink illustrated in FIG. 9, the pattern illustrated in FIG. 11A has a higher ratio of the print permitting pixels in the first to third areas. That is, scanning can be performed such that the printing (ejecting) order of the processing liquid is relatively prior to the pigment ink as a whole, by processing the processing liquid data through the use of the mask pattern illustrated in FIG. 11A. On the other hand, the posterior printing mask pattern illustrated in FIG. 11B has the lowest 6.25% ratio of print permitting pixels in the first to fourth areas, with the ratio gradually rising in the fifth and subsequent areas. That is, the ratio of print permitting pixels corresponding to nozzle group located in back end portion of the nozzle arrangement in a printing medium conveying direction is higher than the ratio of print permitting pixels corresponding to nozzle group located in front end portion of the nozzle arrangement in the printing medium conveying direction, for the unit area of the printing medium. By processing the processing liquid data through the use of the mask pattern illustrated in FIG. 11B, scanning can be performed such that the printing order of the processing liquid as a whole is posterior to the pigment ink.

Referring to FIG. 8 again, the process 9206 with use of the prior printing mask illustrated in FIG. 11A is performed when the mask selecting parameter MP is "0", whereas the process 9207 with use of the posterior printing mask illustrated in FIG. 11B is performed when the mask selecting parameter MP is "1". Thus, printing data 9208 for each scan of the processing liquid is generated. That is, when the printing duty of the ink is determined to be relatively low (parameter MP is 0), processing liquid can be ejected by a scan which is as prior as possible in comparison with the ink. In addition, when the printing duty of the ink is determined to be relatively high (parameter MP is 1), the processing liquid can be ejected by a scan which is as posterior as possible in comparison with the ink. Thereby, variation of the glossiness can be suppressed regardless of variation of printing duty of the ink. At the same time, it becomes possible to adjust the glossiness with the minimum necessary amount of processing liquid since the glossiness is adjusted not by changing the amount of the processing liquid, but by changing the printing order, depending on the printing duty of the ink.

The print control part 309 controls the printing head 22 and the conveying of the printing medium to perform printing, based on the binary printing data 9106 of each color ink after mask processing and binary printing data 9208 of the processing liquid, generated in the image processing part as described above.

As thus described, the present invention controls an ejection order of ejecting the ink and the processing liquid in a relative movement of a printing head to a printing medium such as scanning of the printing head to a unit area of the printing medium, according to the printing duty. The present invention then performs a control of setting the amount of the processing liquid ejected prior to the ink being greater than the amount of the processing liquid ejected posterior to the ink in a case of relatively low printing duty and the amount of the processing liquid ejected prior to the ink being smaller than the amount of the processing liquid ejected posterior to the ink in a case of relatively high printing duty. The applying amount of the processing liquid is controlled according to printing duty as described above, the applying amount of the processing liquid can be reduced compared with a case where the processing liquid is applied posterior to ink to overcoat an image with the processing liquid.

Second Embodiment

A second embodiment of the present invention relates to a configuration which not only reduces gloss unevenness but also improves other image defects specific to pigment ink such as a bronze phenomenon at the same time. The bronze phenomenon is a phenomenon in which the reflected light from the image surface reflects a color different from the color of the illumination light. For example, although the reflected light is preferred to have an achromatic color for the texture when the image is illuminated with a white light source, there may be a case where reddish reflected light is visible with respect to cyan ink, particularly. Such bronze phenomenon is outstanding in glossy paper with a large amount of reflected light on the surface of the printing medium, and is also outstanding in an image generated by using pigment ink rather than dye ink. This is because the pigment ink forms an ink layer on the surface of the glossy paper, and thus the amount of directly reflected light from the ink layer increases.

In the above-mentioned first embodiment, the processing liquid is printed relatively before the ink is printed, in a area where the printing duty of the ink is low. In this case, therefore, exposure of the ink layer increases with respect to an image in the low printing duty area. In other words, the effect of suppressing the bronze phenomenon by covering the surface of the pigment ink layer with the transparent resin contained in the processing liquid may not be sufficient in the first embodiment.

Figure 12:
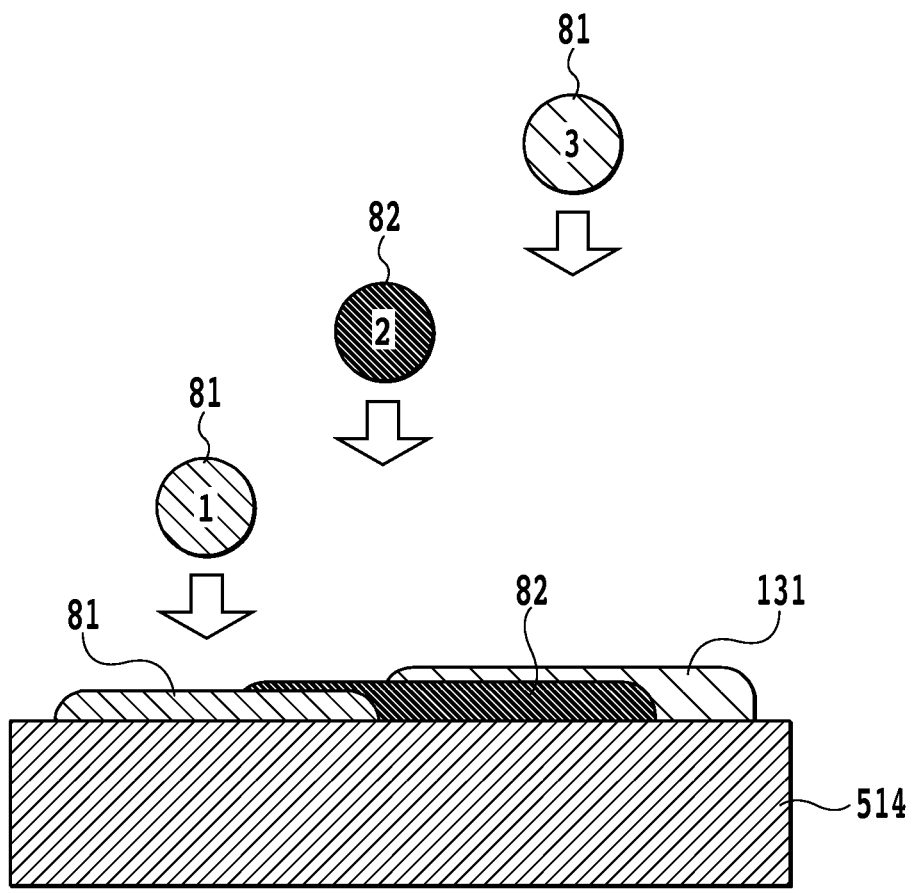
FIG. 12 is a schematic diagram describing a printing method for also suppressing the bronze phenomenon while suppressing gloss unevenness of the ink with the processing liquid according to a second embodiment of the present invention.

FIG. 12 is a schematic diagram describing a printing method for also suppressing the bronze phenomenon while suppressing gloss unevenness of the ink through the use of the processing liquid according to the present embodiment. FIG. 12 illustrates a state in which the processing liquid dot 81 is printed before the ink dot 82 is printed in an image area where the printing duty of the ink is low, and the processing liquid dot 81 is printed again after the ink dot 82 is printed. Glossiness of the ink can be adjusted by the processing liquid dot printed first. Furthermore, the processing liquid dot layer 131 composed of the transparent resin indicated by slanted lines in the figure can be formed on the upper layer of the ink by the processing liquid dot 81 printed later, whereby the bronze phenomenon can be suppressed.

Figure 13:
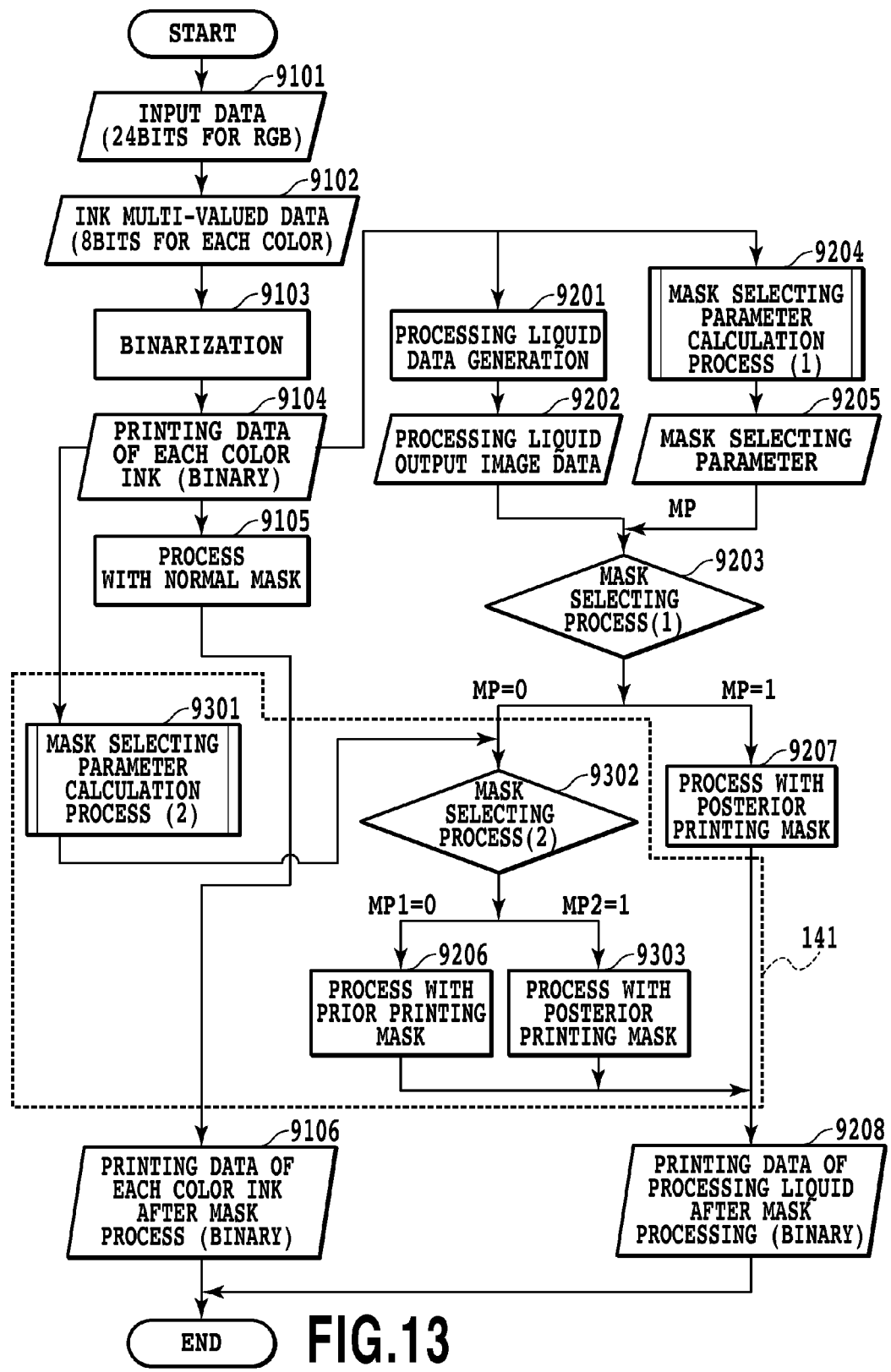
FIG. 13 is a flowchart illustrating a configuration of the image processing part which controls printing of the processing liquid according to the second embodiment.

FIG. 13 is a flow chart illustrating a configuration of the image processing part which controls printing of the processing liquid as described in FIG. 12. The difference from the image processing part described in the first embodiment lies in that a process 191 surrounded by the dashed line in FIG. 13 is added. In the process 141, an additional mask selecting process (2) is performed for a unit area in which MP=0 is determined by a mask selecting part (1). As described in the first embodiment, the unit area in which MP=0 is determined by the mask selecting part (1) is an area where the printing duty of the ink is low. It is determined by the mask selecting process (2) whether this area is a unit area that needs a countermeasure against the bronze phenomenon, and if needed, the processing liquid is printed as described in FIG. 12. Printing the processing liquid relatively before and after printing the ink can be realized by using the mask pattern, as described in FIG. 12.

Figure 14:
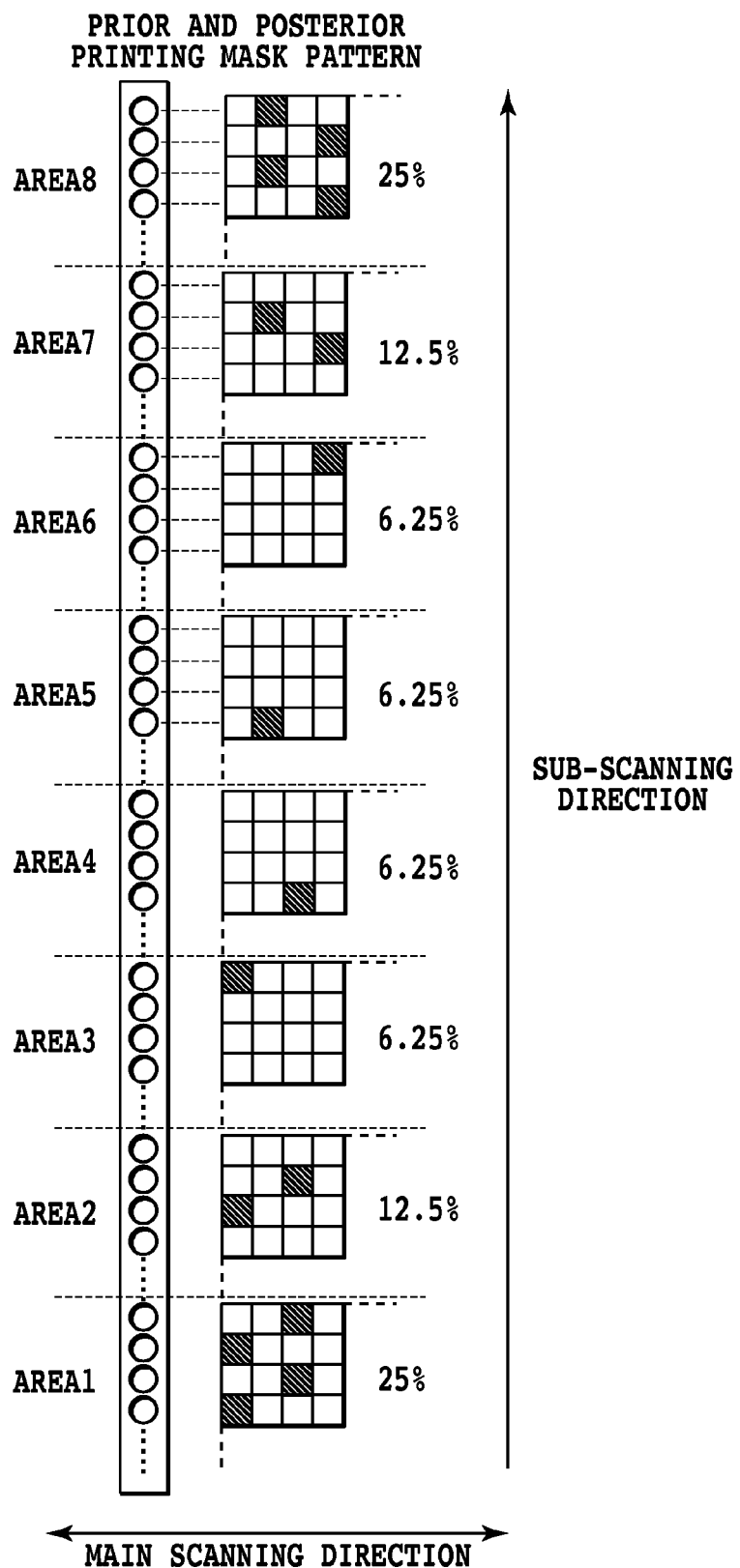
FIG. 14 is a diagram illustrating the prior and posterior printing mask patterns for printing the processing liquid relatively prior and posterior to the ink according to the second embodiment.

FIG. 14 illustrates a prior and posterior printing mask pattern for printing the processing liquid relatively before and after printing the ink. With this mask pattern, the ratio of print permitting pixels in a area 1 corresponding to the initial scan (first scan) and the ratio of print permitting pixels in an area 8 corresponding to the last scan (the eighth scan) are the highest, and the closer to the center, the lower the ratio of print permitting pixels becomes. That is, the pattern of prior and posterior printing masks is such that the ratio of the processing liquid being ejected before the ink being ejected and the ratio of the processing liquid being ejected after the ink being ejected are the same. That is to say, the mask selecting part (2) selects a normal mask having the same ratio for the areas 1 to 8 as illustrated in FIG. 9, for the printing data (binary) 9104 of each color ink, and selects the prior and posterior printing mask patterns illustrated in FIG. 14, for the processing liquid printing data (binary) 9202. This allows the printing order of the processing liquid and the ink to be controlled as illustrated in FIG. 12. Meanwhile, the mask that processes the output data 9104 of each color ink may use a convex mask so that the use frequency of the central area becomes highest. In this case, relative difference between the convex mask pattern and the prior/posterior printing mask pattern illustrated in FIG. 14 becomes large by processing the printing data of the ink through the use of the convex mask, whereby the effect of printing the processing liquid prior to and posterior to the ink can be further enhanced.

Referring to FIG. 13 again, a mask selecting parameter calculation processing (2) 9301 calculates the mask selecting parameter (MP1) which determines whether or not a bronze processing is performed for a unit area with a low printing duty of the ink. In the present embodiment, there are two types of ink among the aforementioned pigment ink that need a bronze countermeasure: cyan (C) and light cyan (LC). Data of cyan and light cyan is sent to the calculation process (2) 9301 from each color ink printing data 9104 and, on the basis thereof, calculation is performed by a method similar to the mask selecting parameter calculation processing described in FIG. 10. That is, dot counting is performed for the unit area to calculate the total number of dots for the C ink and the LC ink, respectively, and a weighting process is performed. The reason for performing the weighting process is that there is difference in the degree of the bronze phenomenon between the C ink and the LC ink which has a low color material concentration. For example, the total number of dots S per unit area is calculated assuming that the weighting coefficient of the C ink is 1 and the weighting coefficient of the LC ink is ⅓. Here, with the number of pixels per unit area being previously determined, a threshold value B of number of dots of the bronze phenomenon determination is defined, where MP1="0" if the total number of dots S is less than the threshold value B, and MP1="1" if the total number of dots S is the threshold value B or more. Since the unit area with MP1=1 is a unit area which needs a bronze countermeasure, the unit area with MP1=1 is determined in the mask selecting unit (2) so that it is processed by using the prior and posterior printing mask patterns illustrated in FIG. 14. The unit area with MP1=0 is determined so that it is processed with the prior printing mask pattern illustrated in FIG. 11A as with the first embodiment.

Based on the binary printing data 9106 of each color ink and the binary printing data 9208 of the processing liquid which have been generated in the above-mentioned image processing part and which have been subjected to the mask processing, the print control part 309 controls the printing head 22 and the conveyance of the printing medium to perform image forming. The image obtained is improved not only in terms of glossiness but also in terms of bronziness because the printing order of the processing liquid relative to the ink is more appropriately controlled so as to be relatively (A) prior or (B) posterior, or (C) prior and posterior, depending on the printing duty of the ink of each color.

In the above case, although the printing order of the processing liquid has been assumed to be controlled so as to be (A) prior, (B) posterior, or further (C) prior and posterior, respectively, by the mask selecting processing (1) 9203 and the mask selecting processing (2) 9302, the image processing method is not limited to the above. For example, in the mask selecting parameter calculation processing (1), the threshold value B of the number of dots for the bronze phenomenon determination is calculated from the dot count values of the cyan ink and the light cyan ink to calculate a ternary mask selecting parameter. Based on the result thereof, the mask of the processing liquid may be selected in the mask selecting processing (1) in an (A) prior, (B) posterior, or (C) prior and posterior manner.

Furthermore, in a unit area where the process 9303 by using the prior and posterior printing mask is performed, the amount of printing of the processing liquid is supposed to increase. In order to keep the amount of printing of the processing liquid to the minimum necessary, the printing data 9202 of the processing liquid may be generated so that printing of the processing liquid illustrated in FIG. 12 can be performed in an on-dot manner.

Other Embodiments

Although it is assumed in the first and second embodiments that the mask selecting parameter (MP) is obtained based on the duty of the printing data of each color ink, the method of obtaining the mask selecting parameter (MP) is not limited thereto. For example, it may be obtained based on a method of referring to a look-up table according to input data (RGB 24-bit), or multi-valued data (8-bit) of each ink color.

Figure 15:
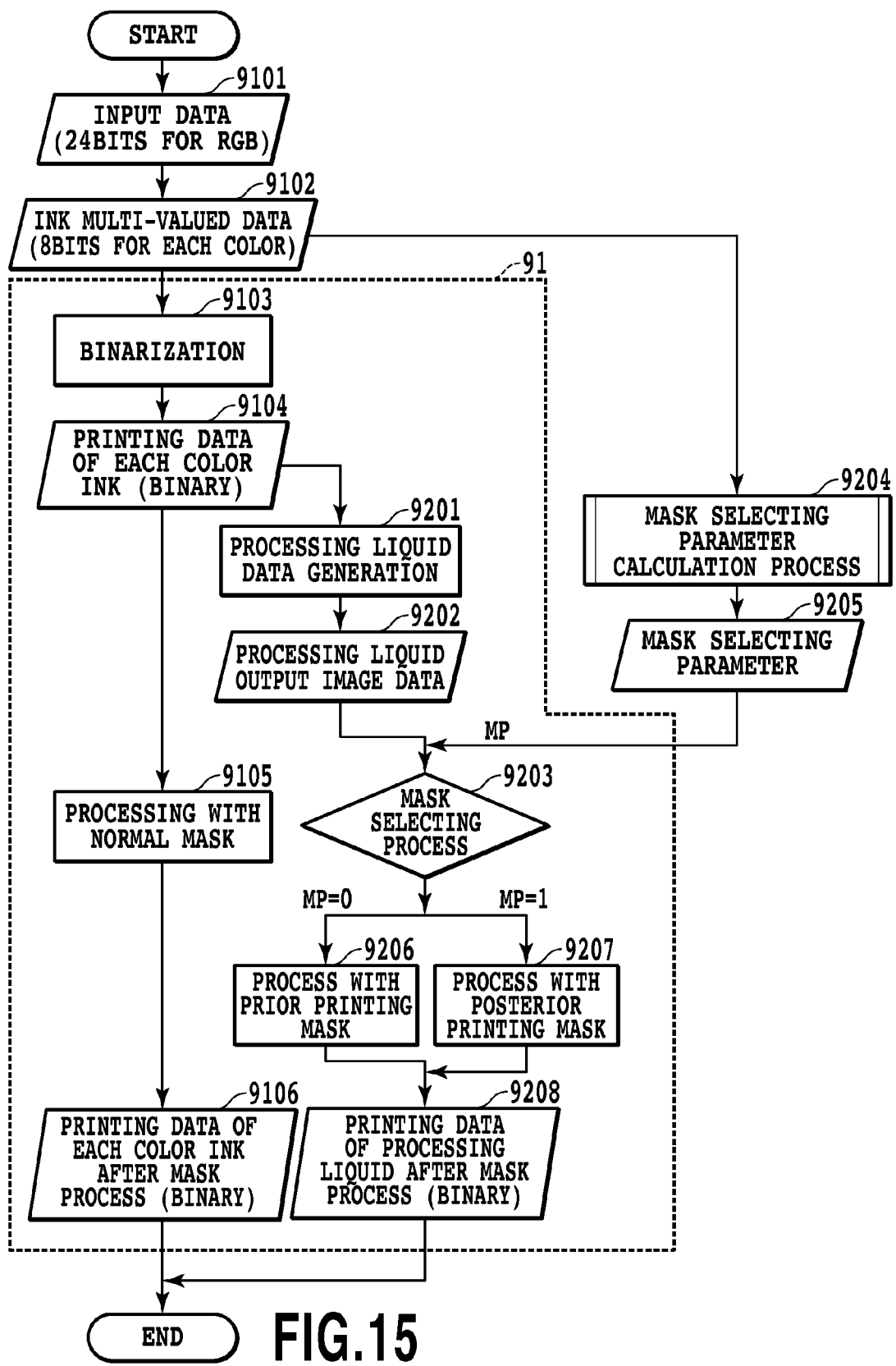
FIG. 15 is a flow chart illustrating a printing data generating process of the ink and the processing liquid when obtaining a mask selecting parameter based on multi-valued data of each ink color according to another embodiment.

FIG. 15 is a flow chart illustrating a printing data generating process of the ink and the processing liquid when the mask selecting parameter is obtained based on multi-valued data of each ink color. The dashed-line area 91 illustrated in FIG. 15 is a part common to the flow chart of FIG. 8 according to the first embodiment.

In the embodiment illustrated in FIG. 15, the multi-valued data 9102 of each color ink is sent to the mask selecting parameter calculation process 9204, in which the calculation for obtaining the mask selecting parameter 9205 is performed. Here, direct weighting for each color ink is performed for the 8-bit ink multi-valued data 9102, with respect to a unit area. The data obtained is summed and averaged by the coupling number of the multi-valued data image resolution for the unit area. Accordingly, 8-bit data corresponding to the printing duty of the unit area is obtained. Subsequently, the mask selecting parameter is calculated by conversion-to N valued data processing that converts the 8-bit data into 5 bits by error diffusion, in the same way as that described above.

In addition, although a configuration has been described in each of the above-mentioned embodiments in which the image processing part 310 that performs the characteristic processing of the invention is provided inside the ink-jet printing apparatus, the image processing area 310 need not be provided inside the ink-jet printing apparatus. For example, a printer driver of a host computer (the image input part 302) connected to the ink-jet printing apparatus may be equipped with the functionality of the image processing part 310. In this case, the printer driver generates the binary printing data and the mask selecting parameter (MO) based on the multi-valued input data received from the application, and supplies it to the printing apparatus. As thus described, an ink-jet printing system comprising the host computer and the ink-jet printing apparatus is also within the scope of the present invention. In this case, the host computer functions as a data supplying apparatus which supplies data to the ink-jet printing apparatus, and also functions as the control part which controls the ink-jet printing apparatus.

In addition, a data generating apparatus comprising the image processing part 310 which performs the characteristic data processing of the invention is also within the scope of the present invention. If an ink-jet printing apparatus is provided with the image processing part 310, the ink-jet printing apparatus functions as the data generating apparatus of the present invention, and if a host computer is provided with the image processing part 310, the host computer functions as the data generating apparatus of the present invention.

Furthermore, a computer program which causes the computer to perform the above-mentioned characteristic data processing, and a storage medium having stored the program in a computer readable manner are also within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-046408, filed Mar. 3, 2010, which is hereby incorporated by reference herein in its entirety.

What is claimed is:

1. A data generating apparatus that generates respective printing data of ink and processing liquid that are used for printing in which a printing head for ejecting the ink and the processing liquid for forming a transparent layer on a surface of a printing medium is used to eject the ink and the processing liquid to the printing medium while the printing head is moved relative to the printing medium, said apparatus comprising:

an acquiring unit configured to acquire printing duty for a unit area of the printing medium, the printing duty being based the printing data of the ink; and a control unit configured to control an ejection order of the ink and processing liquid in ejecting the ink and processing liquid to the unit area of the printing medium under the relative movement of the printing head, so that an amount of the processing liquid ejected prior to the ink is greater than the amount of the processing liquid ejected posterior to the ink in a case of a first printing duty and the amount of the processing liquid ejected prior to the ink is smaller than an amount of the processing liquid ejected posterior to the ink in a case of a second printing duty that is higher than the first printing duty.

2. The data generating apparatus as claimed in claim 1, wherein the relative movement is a movement in which the printing head scans the printing medium, a plurality of scans of the printing head completes printing of the unit area, and the ejection order corresponds to an order in which ejection is performed in a prior or posterior scan to a scan in which ejection is performed, among the plurality of scans to the unit area.

3. The data generating apparatus as claimed in claim 1, wherein said control unit controls the ejection order by using masks that are different between the first and second printing duties.

4. The data generating apparatus as claimed in claim 1, wherein the printing duty is a total printing duty associated with plurality types of ink used for printing.

5. An ink jet printing apparatus that performs printing in which a printing head for ejecting the ink and the processing liquid for forming a transparent layer on a surface of a printing medium is used to eject the ink and the processing liquid to the printing medium while the printing head is moved relative to the printing medium, said apparatus comprising:

an acquiring unit configured to acquire printing duty for a unit area of the printing medium, the printing duty being represented by the printing data of the ink; and a control unit configured to control an ejection order of the ink and processing liquid in ejecting the ink and processing liquid to the unit area of the printing medium under the relative movement of the printing head, so that an amount of the processing liquid ejected prior to the ink is greater than the amount of the processing liquid ejected posterior to the ink in a case of a first printing duty and the amount of the processing liquid ejected prior to the ink is smaller than an amount of the processing liquid ejected posterior to the ink in a case of a second printing duty that is higher than the first printing duty.

6. A data generating method of generating respective printing data of ink and processing liquid that are used for printing in which a printing head for ejecting the ink and the processing liquid for forming a transparent layer on a surface of a printing medium is used to eject the ink and the processing liquid to the printing medium while the printing head is moved relative to the printing medium, said method comprising:

an acquiring step of acquiring printing duty for a unit area of the printing medium, the printing duty being represented by the printing data of the ink; and a control step of controlling an ejection order of the ink and processing liquid in ejecting the ink and processing liquid to the unit area of the printing medium under the relative movement of the printing head, so that an amount of the processing liquid ejected prior to the ink is greater than the amount of the processing liquid ejected posterior to the ink in a case of a first printing duty and the amount of the processing liquid ejected prior to the ink is smaller than an amount of the processing liquid ejected posterior to the ink in a case of a second printing duty that is higher than the first printing duty.

* * * * *